(12) United States Patent
Handa et al.

(10) Patent No.: US 7,537,002 B2
(45) Date of Patent: May 26, 2009

(54) EXOTHERMIC AGENT

(75) Inventors: Harumi Handa, Tokyo (JP); Nobuhiko Takeda, Tokyo (JP)

(73) Assignee: Energy Dyne Corporation, Tokyo (JP)

( * ) Notice: Subject to any disclaimer, the term of this patent is extended or adjusted under 35 U.S.C. 154(b) by 0 days.

(21) Appl. No.: 12/278,601

(22) PCT Filed: Sep. 25, 2007

(86) PCT No.: PCT/JP2007/068535

§ 371 (c)(1),
(2), (4) Date: Aug. 7, 2008

(87) PCT Pub. No.: WO2008/041542

PCT Pub. Date: Apr. 10, 2008

(65) Prior Publication Data

US 2009/0065733 A1     Mar. 12, 2009

(30) Foreign Application Priority Data

Oct. 2, 2006 (JP) ............................. 2006-271174
Feb. 19, 2007 (JP) ............................. 2007-037513
May 9, 2007 (JP) ............................. 2007-124495

(51) Int. Cl.
*F24J 1/00* (2006.01)
*C09K 5/00* (2006.01)
*C06B 33/00* (2006.01)

(52) U.S. Cl. ............................. 126/263.01; 126/263.05; 44/252; 252/70; 149/37

(58) Field of Classification Search .............. 126/263.1, 126/263.05; 44/252; 149/37
See application file for complete search history.

(56) References Cited

U.S. PATENT DOCUMENTS

| 3,766,079 | A | * | 10/1973 | Jackman et al. ........ 126/263.01 |
| 6,200,357 | B1 | | 3/2001 | Nakajima |
| 2005/0244308 | A1 | | 11/2005 | Tanaami et al. |

FOREIGN PATENT DOCUMENTS

| EP | 1 126 004 A1 | 8/2001 |
| JP | 2003-171658 A | 6/2003 |
| JP | 3467729 B2 | 9/2003 |
| JP | 2006-152090 A | 6/2006 |
| JP | 2006-241418 A | 9/2006 |
| JP | 2006-273943 A | 10/2006 |
| JP | 2007-131689 A | 5/2007 |
| JP | 4008490 B1 | 9/2007 |

* cited by examiner

*Primary Examiner*—Mark Eashoo
*Assistant Examiner*—Peter F Godenschwager
(74) *Attorney, Agent, or Firm*—Darby & Darby P.C.

(57) ABSTRACT

To provide a novel water-addition type, chemical exothermic agent. An exothermic agent comprising, per mass thereof, more than 30% but not more than 40% of a calcium oxide powder having an average particle size of 75 $\mu$m to 150 $\mu$m, and not less than 60% but less than 70% of a mixed aluminum powder in which an aluminum powder having such a particle size distribution that a particle size of 45 $\mu$m pass is 70.0 to 80.0% and a particle size of 45 to 75 $\mu$m is 20.0 to 30.0% and an aluminum powder having such a particle size distribution that a particle size of 45 $\mu$m pass is 60 to 70%, a particle size of 45 $\mu$m is 20 to 30%, a particle size of 63 $\mu$m is 7 to 10% and a particle size of 75 $\mu$m is 1.0 to 2.0% are mixed at a mass ratio of 1:2. This exothermic agent may further contain 5 to 10%, relative to its total mass, of at least one inorganic salt compound selected from the group consisting of calcium sulfate, ferrous sulfate, magnesium chloride, sodium sulfite, sodium phosphate, and sodium carbonate.

2 Claims, 29 Drawing Sheets

EXOTHERMIC AGENT

CROSS-REFERENCE TO PRIOR APPLICATION

This is a U.S. National Phase Application under 35 U.S.C. §371 of International Patent Application No. PCT/JP2007/068535 filed Sep. 25, 2007, which claims the benefit of Japanese Application Nos. 2006-271174 filed Oct. 2, 2006, 2007-037513 filed Feb. 19, 2007 and 2007-124495 filed May 9, 2007, all of which are incorporated by reference herein. The International Application was published in Japanese on Apr. 10, 2008 as WO 2007/041542 A1 under PCT Article 21(2).

TECHNICAL FIELD

The present invention relates to an exothermic agent. More particularly, the present invention relates an exothermic agent in which calcium oxide having a specified average particle size and a mixed aluminum powder consisting of two aluminum powders having different particle size distributions that are mixed at a mass ratio of 1:2 are incorporated in specified proportions, as well as an exothermic agent in which calcium oxide having a specified average particle size and a mixed aluminum powder consisting of two aluminum powders having different particle size distributions that are mixed at a mass ratio of 1:2 are incorporated in specified proportions, and which further contains an inorganic salt compound incorporated as a third component.

BACKGROUND ART

Heretofore, so-called chemical exothermic agents that utilize the exothermic reaction between a chemical substance and water have been used as a heating device to heat heat-and-serve meals such as ekiben (train lunch box).

Conventionally, the reaction due to the addition of water to calcium oxide has been used as a mainstream exothermic agent. The exothermic agent that utilizes the exothermic reaction between calcium oxide and water satisfies the regulations under the Food Sanitation Law. However, the reaction between calcium oxide and water, if it is accompanied by violent heat generation, may produce a temperature as high as 300 to 450° C. and involves difficulty in temperature control, as well as causing a burn risk when one uses it to heat portable lunch boxes such as ekiben.

A chemical exothermic agent that deals with this defect of the exothermic agent which utilizes the exothermic reaction between calcium oxide and water has been proposed and it utilizes the reaction between water and a mixture consisting of calcium oxide and an aluminum powder. In particular, a chemical exothermic agent has been proposed that focuses on the particle size distribution of the aluminum powder.

For instance, claim 1 of Patent Document 1 discloses "an exothermic agent consisting of, based on its weight, 15 to 30% of a calcium oxide powder of 100 mesh ($-150 \mu m \geqq 90\%$) to 200 mesh ($-75 \mu m \geqq 95\%$) and 70 to 85% of an aluminum powder having such a particle size distribution that a $-330$ mesh ($-45 \mu m$) is 40 to 60%, a $+330$ mesh ($+45 \mu m$) is 15 to 30%, a $+235$ mesh ($+63 \mu m$) is 15%>, and a $+200$ mesh ($+75 \mu m$) is 10%>."

Paragraph 0025 of Patent Document 1 suggests that the applicable aluminum powder is one having such a particle size distribution that a $-330$ mesh ($-45 \mu m$) is 35 to 60%, a $+330$ mesh ($+45 \mu m$) is 15 to 30%, a $+235$ mesh ($+63 \mu m$) is 5 to 15%, and a $+140$ mesh ($+106 \mu m$) is 7%> or one having such a particle size distribution that a $-330$ mesh ($-45 \mu m$) is 70 to 90%, a $+330$ mesh ($+45 \mu m$) is 30%>, a $+235$ mesh ($+63 \mu m$) is 3%>, and a $+200$ mesh ($+75 \mu m$) is 2%>.

The defect of the chemical exothermic agent that utilizes the reaction between water and the mixture consisting of calcium oxide and an aluminum powder is that it evolves hydrogen gas. When the exothermic agent comprising the mixture of calcium oxide and aluminum contacts water, calcium hydroxide ($Ca(OH)_2$) is first generated in accordance with the reaction formula (1).

$$CaO+H_2O=Ca(OH)_2 \qquad (1)$$

On the other hand, the aluminum powder reacts radically with calcium hydroxide to generate calcium aluminate and hydrogen in accordance with the following reaction formula (2).

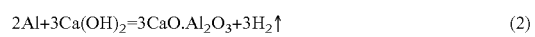

$$2Al+3Ca(OH)_2=3CaO.Al_2O_3+3H_2\uparrow \qquad (2)$$

In the case of this reaction, the evolution of hydrogen ($H_2$) gas increases in proportion to the amount of aluminum. In other words, 3/2 moles of hydrogen ($H_2$) gas evolves per mole of aluminum.

Therefore, the first point of improvement that should be made in the exothermic agent that utilizes the reaction between water and the mixture consisting of calcium oxide and aluminum as described in Patent Document 1 is that the evolution of hydrogen gas is made as small as possible. This is the most important issue that was desired by users in the course of development of uses of the exothermic agent.

Furthermore, in the course of development of uses of the exothermic agent that utilizes the reaction between water and the mixture consisting of calcium oxide and aluminum, users submitted the following request. The exothermic agent should be economical and have high thermal efficiency in that so-called "small-volume" foods such as nursing bottles, canned or bottled Japanese sake, canned coffee, canned soft drinks, as well as shao mai (steamed dumpling with the dough gathered at the top) and nikuman (Chinese steamed pork bun) that are repackaged into smaller sizes can be heated by that exothermic agent to the desired temperature (at which they can be eaten) in a short period of time.

In those cases, the bottom area is in the range from approximately 12 cm² to 19 cm². With such a small area, the weight of the chemical exothermic agent that can be accommodated is no more than about 5 g to 10 g. Therefore, the request of users is that even if a chemical exothermic agent that contains calcium oxide and aluminum in specified proportions weighs as small as 5 g, it should be capable of raising the temperature to the neighborhood of 100° C. to 90° C. quickly after its reaction with water and that, thereafter, the temperature drops at a small enough rate so that it can maintain the temperature in the neighborhood of 80° C. even after the lapse of 600 seconds. What is important here is that in order to prevent the user against an accident such as burn, control should be done to ensure that the maximum temperature will by no means reach 100° C. and the temperature should be maintained in the neighborhood of 80° C. even after the lapse of 600 seconds. In particular, maintenance of temperatures in the neighborhood of 80° C. even after the lapse of 600 seconds is an essential condition to meet since the exothermic agent of the present invention may occasionally be used in cold environments below the freezing point, as exemplified by mountain climbing, fishing, field shelters from large-scale disasters, and heating of fighter rations.

The present inventors first made studies on how to increase the unit amount of heat generated. As already mentioned, the reaction between water and the exothermic agent consisting of the mixture of calcium oxide and the aluminum powder follows the reaction formulas (1) and (2).

In particular, in the reaction formula (2), aluminum reacts radically with the calcium hydroxide produced by the reaction formula (1) so as to generate calcium aluminate and hydrogen.

$$2Al+3Ca(OH)_2=3CaO.Al_2O_3+3H_2\uparrow \quad (2)$$

In the case of this reaction, the amount of heat generated per unit amount of aluminum is so great that an increase in the amount of aluminum will lead to an increase in the total amount of heat generated. However, the evolution of hydrogen ($H_2$) gas increases with the amount of aluminum, so the method of increasing the amount of aluminum is obviously not preferable from the viewpoint of reducing the evolution of hydrogen.

Therefore, given the exothermic agent consisting of the mixture of calcium oxide and aluminum, it is impossible to satisfy the aforementioned need of users by merely adjusting the amount of calcium oxide and/or aluminum.

Regarding a so-called "water-addition exothermic agent" which generates heat by reaction with water, as exemplified by calcium oxide, a method has been proposed to control its heat generation by adding an inorganic salt and/or an organic salt to it.

For example, Patent Document 2 discloses a method of controlling the heat generation from a water-addition exothermic agent consisting of calcium oxide which is characterized by adding to the water-addition exothermic agent an aqueous solution containing an inorganic salt such as potassium carbonate, sodium carbonate, magnesium chloride, magnesium sulfate, potassium chloride, calcium hydroxide or sodium sulfate, or an organic salt such as sodium benzoate or sodium dodecylsulfate.

As described in various documents, it is known that the reaction between calcium oxide and water, if it is accompanied by a violent heat generation, may produce a temperature as high as 300 to 450° C. and involves difficulty in temperature control. The object of the invention described in Patent Document 2 is to ensure that by addition of the aforementioned inorganic salts and/or organic salts, the maximum temperature of the vapor evolved in the reaction between calcium oxide and water which may become as high as 300 to 450° C. is maintained at 100 to 280° C. for 260 to 480 seconds. Therefore, the invention described in Patent Document 2 also fails to meet the users' need mentioned in the foregoing paragraph 0010.

Patent Document 1: Specification of Japanese Patent No. P3467729

Patent Document 2: Japanese Patent Publication No. P 2003-171658 A

DISCLOSURE OF THE INVENTION

Problems to be Solved by the Invention

A problem to be solved by the invention is to provide a chemical exothermic agent that contains calcium oxide and aluminum in specified proportions and which is economical and has high thermal efficiency in that so-called "small-volume" foods such as nursing bottles, canned or bottled Japanese sake, canned coffee, canned soft drinks, as well as shao mai (steamed dumpling with the dough gathered at the top) and nikuman (Chinese steamed pork bun) that are repackaged into smaller sizes can be heated by that exothermic agent to the desired temperature (at which they can be eaten) in a short period of time.

A more specific problem to be solved by the invention is that even if the chemical exothermic agent containing calcium oxide and aluminum in specified proportions weighs as small as 5 g, it should be capable of raising the temperature to the neighborhood of 100° C. to 90° C. quickly after its reaction with water while controlling the maximum temperature not to exceed 100° C. and that, thereafter, the temperature drops at a small enough rate so that it can maintain the temperature in the neighborhood of 80° C. even after the lapse of 600 seconds.

Means for Solving the Problems

The present inventors particularly focused on the particle size distributions of aluminum powders and found that the above-mentioned problems could be solved by an exothermic agent in which a mixed aluminum powder consisting of two aluminum powders having different particle size distributions that were mixed at a mass ratio of 1:2 and calcium oxide having a specified average particle size were incorporated in specified proportions, as well as an exothermic agent in which calcium oxide having a specified average particle size and a mixed aluminum powder consisting of two aluminum powders having different particle size distributions that were mixed at a mass ratio of 1:2 were incorporated in specified proportions, and which further contained a third component incorporated therein. Therefore, the above-mentioned problems can be solved by the means described in the following items.

1. An exothermic agent comprising, per mass thereof, (1) more than 30% but not more than 40% of a calcium oxide powder having an average particle size of 75 μm to 150 μm, and (2) not less than 60% but less than 70% of a mixed aluminum powder in which (a) an aluminum powder having such a particle size distribution that a particle size of 45 μm pass is 70.0 to 80.0% and a particle size of 45 to 75 μm is 20.0 to 30.0% and (b) an aluminum powder having such a particle size distribution that a particle size of 45 μm pass is 60 to 70%, a particle size of 45 μm is 20 to 30%, a particle size of 63 μm is 7 to 10% and a particle size of 75 μm is 1.0 to 2.0% are mixed at a mass ratio of 1:2.

2. An exothermic agent comprising, per mass thereof, (1) more than 30% but not more than 40% of a calcium oxide powder having an average particle size of 75 μm to 150 μm, and (2) not less than 60% but less than 70% of a mixed aluminum powder in which (a) an aluminum powder having such a particle size distribution that a particle size of 45 μm pass is 70.0 to 80.0% and a particle size of 45 to 75 μm is 20.0 to 30.0% and (b) an aluminum powder having such a particle size distribution that a particle size of 45 μm pass is 60 to 70%, a particle size of 45 μm is 20 to 30%, a particle size of 63 μm is 7 to 10% and a particle size of 75 μm is 1.0 to 2.0% are mixed at a mass ratio of 1:2, (3) further containing at least one inorganic salt compound added to the exothermic agent comprising (1) and (2) in an amount of 5 to 10% relative to the total mass of that exothermic agent, the inorganic salt compound being selected from the group consisting of calcium sulfate, ferrous sulfate, magnesium chloride, sodium sulfite, sodium phosphate, and sodium carbonate.

Effects of the Invention

1. According to the invention recited in claim 1, (1) the calcium oxide powder having an average particle size of 75 μm to 150 μm is adjusted to more than 30% but not more than 40% per mass of the exothermic agent, and (2) the mixed aluminum powder in which (a) an aluminum powder having such a particle size distribution that a particle size of 45 μm pass is 70.0 to 80.0% and a particle size of 45 to 75 μm is 20.0 to 30.0% and (b) an aluminum powder having such a particle size distribution that a particle size of 45 μm pass is 60 to 70%, a particle size of 45 μm is 20 to 30%, a particle size of 63 μm is 7 to 10% and a particle size of 75 μm is 1.0 to 2.0% are mixed at a mass ratio of 1:2 is adjusted to not less than 60% but less than 70%; as a result, an exothermic agent is provided that is far superior to the case where the aluminum powder having such a particle size distribution that a particle size of 45 μm pass is 70.0 to 80.0% and a particle size of 45 to 75 μm is 20.0 to 30.0% or the aluminum powder having such a particle size distribution that a particle size of 45 μm pass is 60 to 70%, a particle size of 45 μm is 20 to 30%, a particle size of 63 μm is 7 to 10% and a particle size of 75 μm is 1.0 to 2.0% is used individually and, what is more, the time it takes to reach the use temperature of 70 to 80° C., the maximum ultimate temperature, the time it takes to reach the maximum ultimate temperature, and the temperature history from the start of heat generation to the lapse of 10 minutes can be improved synergistically over the case where the respective aluminum powders are used individually.

2. According to the invention recited in claim 2, (3) at least one inorganic salt compound selected from the group consisting of calcium sulfate, ferrous sulfate, magnesium chloride, sodium sulfite, sodium phosphate, and sodium carbonate is further added in an amount of 5 to 10%, based on the total mass of an exothermic agent consisting of, per mass thereof, (1) more than 30% but not more than 40% of a calcium oxide powder having an average particle size of 75 μm to 150 μm, and (2) not less than 60% but less than 70% of a mixed aluminum powder in which (a) an aluminum powder having such a particle size distribution that a particle size of 45 μm pass is 70.0 to 80.0% and a particle size of 45 to 75 μm is 20.0 to 30.0% and (b) an aluminum powder having such a particle size distribution that a particle size of 45 μm pass is 60 to 70%, a particle size of 45 μm is 20 to 30%, a particle size of 63 μm is 7 to 10% and a particle size of 75 μm is 1.0 to 2.0% are mixed at a mass ratio of 1:2; as a result, even if the exothermic agent is used in such a small amount that its total weight may range from about 5.25 g to about 5.5 g, a maximum temperature of 96.4° C. is reached in 120 seconds after the start of an exothermic reaction and at the point in time of 600 seconds, 88.4° C. is maintained. To take an example of the exothermic agent according to claim 1, the maximum ultimate temperature is 96.1° C. in 195 seconds and it is 79.6° C. at the point in time of 600 seconds; hence, the addition of the inorganic salt compound contributes to enhancing the maximum ultimate temperature and maintaining a further enhanced temperature for a prolonged time.

BEST MODES FOR CARRYING OUT THE INVENTION

Figure 1:
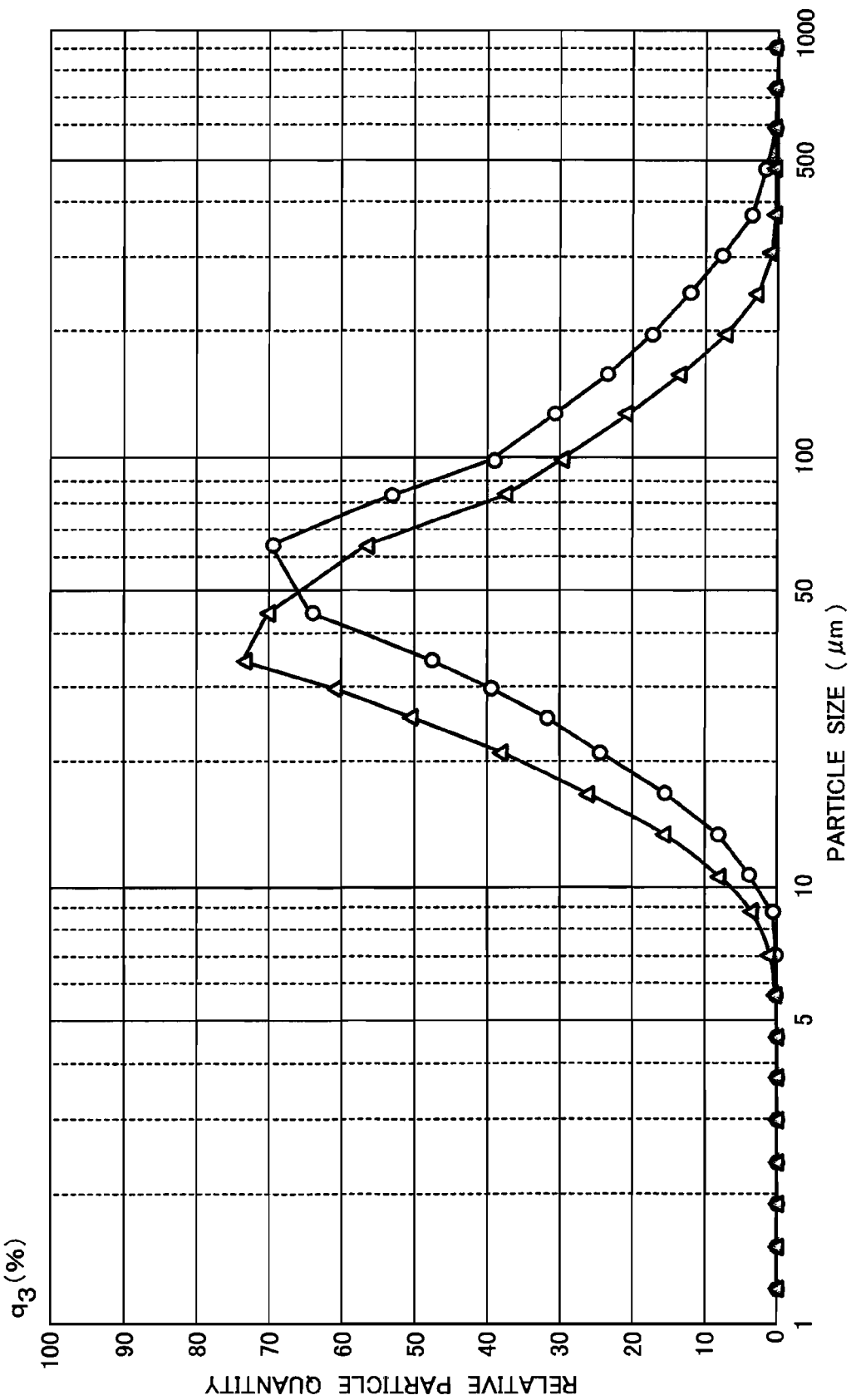
FIG. 1 is a graph showing the particle size distributions of the 1:2 mixed aluminum powder used in the present invention (Example 1) and the aluminum powder described in Patent Document 1 (Comparative Example 1).

In searching for a means of solving the aforementioned problems, the present inventors relied upon the Arrhenius particle collision theory which was a development of the reaction rate theory. According to the Arrhenius particle collision theory, it is clear that the smaller the particles, the greater the frequency of their collision and the greater the reaction rate. If this theory is applied to the reaction between water and an exothermic agent consisting of calcium and an aluminum powder, it follows that the smaller the particle size of the calcium oxide powder or the smaller the particle size of the aluminum powder, the greater the reaction rate. It should, however, be noted that in the case where two or more kinds of fine particles A and B having particle size distributions form an aggregate, it simply does not follow that the smaller the sizes of fine particles A and B, the better. The reason is that in the presence of water, the fine particles of small size combine to grow into larger particles, the so-called "agglomeration" phenomenon. The way to prevent this problem is by determining the ratio between the sizes of fine particle A and fine particle B, as well as the ratio between their particle size distributions from the aforementioned Arrhenius theory and the theory of electrostatic particle adhesion.

From this viewpoint, the present inventors studied the aluminum powder described in Patent Document 1. The aluminum powder described in Patent Document 1 has such a particle size distribution that a 45 μm pass is 40 to 60%, a 45 μm is 15 to 30%, a 63 μm is not more than 15%, and a 75 μm is not more than 10%. In other words, the larger size distribution of 45 μm to 75 μm is 60 to 40% whereas the smaller size distribution of 45 μm pass which contributes to increasing the reaction rate is as small as 40 to 60%. The present inventors assumed that this would be a major reason why the exothermic agent described in Patent Document 1 is not ideal from the viewpoint of heat generating performance.

Under the circumstances, the present inventors considered practical factors including the theory of manufacturing aluminum powders, the capability of the manufacturers, and the manufacturing costs and, assuming that the central diameter of one particle in the aluminum powder would be in the range of 40 to 50 μm, changed its particle size distribution in various ways and applied the foregoing formulas (1) and (2) to confirm how the particle size distribution correlated to the time it takes to reach the use temperature of 70 to 80° C., the maximum ultimate temperature, the time it takes to reach the maximum ultimate temperature, and the temperature history from the start of heat generation to the lapse of 10 minutes.

To begin with, the present inventors prepared an aluminum powder in which aluminum particles had a central size in the range of 40 to 50 μm, the maximum particle size was 75 μm, the size distribution of particles with a size of 45 μm pass was larger than the size distribution for sizes of 45 to 75 μm and also larger than 40 to 60% which is the size distribution of particles with a size of 45 μm pass that is described in Patent Document 1. To be more specific, an aluminum powder involving such a particle size distribution that a 45 μm pass was 70.0 to 80.0% and 45 to 75 μm was 20.0 to 30.0% was mixed with a specified type of calcium oxide at specified quantity ratios to prepare exothermic agents and by applying the foregoing formulas (1) and (2), the present inventors compared them with the exothermic agent described in Patent Document 1 to study the correlation with the time it takes to reach the use temperature of 70 to 80° C., the maximum ultimate temperature, the time it takes to reach the maximum ultimate temperature, and the temperature history from the start of heat generation to the lapse of 10 minutes. As a result, the present inventors found that the aluminum powder involving such a particle size distribution that a 45 μm pass was 70.0 to 80.0% and 45 to 75 μm was 20.0 to 30.0% was superior to the aluminum powder used in the exothermic agent described in Patent Document 1.

Note that the passage reading "an aluminum powder involving such a particle size distribution that a 45 μm pass is 70.0 to 80.0% and 45 to 75 μm is 20.0 to 30.0%" as used herein means that the particle size suffices to involve such a particle size distribution that a 45 μm pass is 70.0 to 80.0% and 45 to 75 μm is 20.0 to 30.0% and that the inclusion of other particles larger than 75 μm that cannot be removed without causing some disadvantage to manufacturing costs or any impurities (unavoidable impurities) that are essentially contained in the starting material and which are impossible to remove or which cannot be removed without causing some disadvantage to the manufacturing process shall not be eliminated in any positive manner.

In this case, if all particles have a size of 45 μm pass, the aggregate consists of only small-sized particles, so it may be presumed that agglomeration of the individual particles will occur.

A specific example of the aluminum powder having that particle size distribution may be such that a 45 μm pass is 75.0 to 80.0%, 45 to 75 μm is 21.0 to 24.0%, and 75 μm is 0.5-1.0%, or that a 45 μm pass is 75.5 to 78.8%, 45 to 75 μm is 20.6 to 23.8%, and 75 μm is 0.5-0.7%.

Further, the present inventors searched for an aluminum powder having such a particle size distribution that by mixing it with the aluminum powder involving such a particle size distribution that a 45 μm pass is 70.0 to 80.0% and 45 to 75 μm is 20.0 to 30.0%, the exothermic effect of using this aluminum powder involving such a particle size distribution that a 45 μm pass is 70.0 to 80.0% and 45 to 75 μm is 20.0 to 30.0% can be synergistically improved while at the same time the cost of that aluminum powder involving such a particle size distribution that a 45 μm pass is 70.0 to 80.0% and 45 to 75 μm is 20.0 to 30.0% can be reduced.

And experiments were repeated with the particle size distribution and the mixing ratio being changed; as a result, it was found that when an aluminum powder involving such a particle size distribution that a 45 μm pass is 60.0 to 70.0%, a 45 μm is 20.0 to 30.0%, a 63 μm is 7 to 10% and a 75 μm is 1.0 to 2.0% was mixed with the aforementioned aluminum powder involving such a particle size distribution that a 45 μm pass is 70.0 to 80.0% and 45 to 75 μm is 20.0 to 30.0%, the former aluminum powder being twice the amount of the latter, a better state of heat generation was achieved than when the two aluminum powders were used individually; the present invention has been accomplished on the basis of this finding. Hereinafter, the mixture at a 1:2 mass ratio of (a) the aluminum powder involving such a particle size distribution that a 45 μm pass is 70.0 to 80.0% and 45 to 75 μm is 20.0 to 30.0% and (b) the aluminum powder involving such a particle size distribution that a 45 μm pass is 60.0 to 70.0%, a 45 μm is 20.0 to 30.0%, a 63 μm is 7 to 10% and a 75 μm is 1.0 to 2.0% is sometimes referred to as a "1:2 mixed aluminum powder."

Note that the passage reading "an aluminum powder involving such a particle size distribution that a 45 μm pass is 60.0 to 70.0%, a 45 μm is 20.0 to 30.0%, a 63 μm is 7 to 10% and a 75 μm is 1.0 to 2.0%" as used herein means that the particle size suffices to involve such a particle size distribution that a 45 μm pass is 60.0 to 70.0%, a 45 μm is 20.0 to 30.0%, a 63 μm is 7 to 10% and a 75 μm is 1.0 to 2.0% and that the inclusion of other particles larger than 75 μm that cannot be removed without causing some disadvantage to manufacturing costs or any impurities (unavoidable impurities) that are essentially contained in the starting material and which are impossible to remove or which cannot be removed without causing some disadvantage to the manufacturing process shall not be eliminated in any positive manner.

Important requirements that should be met by the present invention to specify the amounts in which the calcium oxide powder and the 1:2 mixed aluminum powder are to be incorporated include the short time it takes to initiate the exothermic reaction, the greatness of the total amount of heat generated, the ability to maintain temperatures not lower than 90° C. for at least 20 minutes, and no increase in mass and bulk; in addition, the amount of water to be added should be made as small as possible and nevertheless the time it takes to initiate the exothermic reaction is shortened, the total amount of heat generated is increased and temperatures not lower than 90° C. are securely maintained for at least 20 minutes, thereby contributing to a lighter total mass and a smaller volume as the exothermic agent.

To this end, the present inventors established that the amount of water relative to the total mass of the exothermic agent consisting of the calcium oxide powder and the 1:2 mixed aluminum powder should be no greater than twice at maximum; based on the chemical reaction kinetics, they then calculated approximate amounts of the calcium oxide powder and the 1:2 mixed aluminum powder that would satisfy the above-mentioned conditions and verified them by experimentation. As it turned out, the mixed aluminum powder was preferably not less than 60% but less than 70% and the calcium oxide powder more than 30% but not more than 40%, relative to the total mass of the exothermic agent consisting of the calcium oxide powder and the 1:2 mixed aluminum powder.

Now, when the exothermic agent consisting of the calcium oxide powder and the 1:2 mixed aluminum powder contacts water, the first thing to occur is the following reaction between the calcium oxide powder and the water.

$$CaO + H_2O = Ca(OH)_2 \quad (1)$$

This reaction produces a heat quantity equal to its standard enthalpy of formation, $\Delta H_{298} = -65.17$ KJmole$^{-1}$.

Therefore, one may simply assume that an increase in the amount of CaO will lead to an increased amount of heat generated. In fact, however, an increase in the amount of CaO also lead to a proportionate increase in the mass (bulk) of the amount of heat generated, with the result that the aforementioned needs of users are not satisfied.

On the other hand, the aluminum powder radically reacts with the calcium hydroxide to produce calcium aluminate and hydrogen in accordance with the following equation (2).

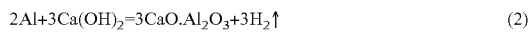
$$2Al + 3Ca(OH)_2 = 3CaO \cdot Al_2O_3 + 3H_2\uparrow \qquad (2)$$

In the case of this reaction, the amount of heat generated per unit of aluminum is so great that an increase in the amount of aluminum also leads to an increase in the total amount of heat generated. However, more hydrogen ($H_2$) gas will evolve as the amount of aluminum is increased, so the method of increasing the amount of aluminum is not preferred. By way of reference, 3/2 moles of hydrogen ($H_2$) gas evolves from 1/2 mole of aluminum, so 3 moles of hydrogen ($H_2$) gas evolves when 2 moles of aluminum are used.

For these reasons, it is obvious that the method of increasing calcium oxide and/or aluminum is not preferred for the purpose of developing a novel exothermic agent that satisfies the user's needs described in the aforementioned paragraph 0005.

Under the circumstances, the present inventors studied the addition of a third component to the mixture of calcium oxide and aluminum. The third component other than calcium oxide and aluminum had to be selected on the condition that the following requirements be satisfied.

1. Even if the total mass of the exothermic agent consisting of the aluminum powder, the quicklime powder, and the third component is only about 5 g, it should produce the required amount of heat generation and exothermic behavior as needed by users while avoiding an increase in the overall bulk.
2. Aside from the water vapor, no unwanted gas such as hydrogen gas should be evolved.
3. Should there occur a direct contact with food that is to be heated, no toxic effect should be exerted on the human body.

In determining compounds that would satisfy the above-mentioned conditions 1, 2 and 3, the first requirement to be met was that the enthalpy of dissolution into water or the enthalpy of hydration should be negative (exothermic), and the second requirement was that they should preferably be food additives.

As a result of repeated experimentation, the present inventors found that the inorganic salt compound to be added as the third component to the composition consisting of the aluminum powder and the quicklime powder is preferably calcium sulfate, ferrous sulfate, magnesium chloride, sodium sulfite, sodium phosphate or sodium carbonate. Accordingly, the present invention is based on this finding. Note that calcium sulfate, ferrous sulfate, magnesium chloride, sodium sulfite, sodium phosphate, and sodium carbonate may be used either independently or in admixture of two or more of these compounds.

According to the present invention, the inorganic salt compound as the third component that is selected from the group consisting of calcium sulfate, ferrous sulfate, magnesium chloride, sodium sulfite, sodium phosphate, sodium carbonate, and mixtures thereof is preferably added in an amount of 5 to 10% to the exothermic agent comprising, per mass thereof, (1) more than 30% but not more than 40% of a calcium oxide powder having an average particle size of 75 µm to 150 µm, and (2) not less than 60% but less than 70% of a mixed aluminum powder in which (a) an aluminum powder having such a particle size distribution that a particle size of 45 µm pass is 70.0 to 80.0% and a particle size of 45 to 75 µm is 20.6 to 30.0% and (b) an aluminum powder having such a particle size distribution that a particle size of 45 µm pass is 60 to 70%, a particle size of 45 µm is 20 to 30%, a particle size of 63 µm is 7 to 10% and a particle size of 75 µm is 1.0 to 2.0% are mixed at a mass ratio of 1:2, the indicated amount of the third component being relative to the total mass of the exothermic agent. Take, for example, the case where the exothermic agent consisting of the aforementioned (1) calcium oxide powder and (2) mixed aluminum powder has a total mass of 5 g; since the amount of the third component to be added is "5 to 10% relative to the total mass of the exothermic agent," the inorganic salt compound added as the third component to this exothermic agent weighs 0.25 g to 0.5 g and the exothermic agent eventually has a total weight of 5.25 g to 5.5 g. If the amount of the inorganic salt compound added is less than 5%, it is impossible to meet the user's need for further improvement of the basic exothermic agent described in the above-mentioned paragraphs 0005 and 0030; on the other hand, adding the inorganic salt compound in an amount greater than 10% simply results in a higher cost, which is uneconomical.

Specifics will follow.

Calcium sulfate ($CaSO_4(\alpha)$), at the point in time when 1 mole of it as a pure substance dissolves in water to have a concentration of 1 molkg$^{-1}$, gives a standard enthalpy of dissolution of −26.9 ∆solH/KJmol$^{-1}$; this compound is a food additive approved as a coagulant for tofu (soybean curd).

Calcium sulfate ($CaSO_4(\beta)$), at the point in time when 1 mole of it as a pure substance dissolves in water to have a concentration of 1 molkg$^{-1}$, gives a standard enthalpy of dissolution of −31.30 ∆solH/KJmol$^{-1}$; this compound is a food additive approved as a coagulant for tofu (soybean curd).

In addition, calcium sulfate, at the point in time when 1 mole of it as a pure substance incorporates 0.5 mole of water to form a hydrate, gives an enthalpy of hydration of −2.9 ∆hydH/KJmol$^{-1}$; this compound is a food additive approved as a coagulant for tofu (soybean curd).

Further, calcium sulfate, at the point in time when 1 mole of it as a pure substance incorporates 2 moles of water to form a hydrate, gives an enthalpy of hydration of −21.0 ∆hydH/KJmol$^{-1}$; this compound is a food additive approved as a coagulant for tofu (soybean curd).

Ferrous sulfate ($FeSO_4$), at the point in time when 1 mole of it as a pure substance dissolves in water to have a concentration of 1 molkg$^{-1}$, gives a standard enthalpy of dissolution of −69.90 ∆solH/KJmol$^{-1}$; this compound is a food additive approved as a coloring agent.

Ferrous sulfate ($FeSO_4$), at the point in time when 1 mole of it as a pure substance incorporates 1 mole of water to form a hydrate, gives an enthalpy of hydration of −30.8 ∆hydH/KJmol$^{-1}$; this compound is a food additive approved as a coloring agent.

In addition, ferrous sulfate ($FeSO_4$), at the point in time when 1 mole of it as a pure substance incorporates 4 moles of water to form a hydrate, gives an enthalpy of hydration of −55.6 ∆hydH/KJmol$^{-1}$; this compound is a food additive approved as a coloring agent.

In addition, ferrous sulfate ($FeSO_4$), at the point in time when 1 mole of it as a pure substance incorporates 6 moles of water to form a hydrate, gives an enthalpy of hydration of −69.9 ∆hydH/KJmol$^{-1}$; this compound is a food additive approved as a coloring agent.

In addition, ferrous sulfate ($FeSO_4$), at the point in time when 1 mole of it as a pure substance incorporates 7 moles of water to form a hydrate, gives an enthalpy of hydration of −79.9 ∆hydH/KJmol$^{-1}$; this compound is a food additive approved as a coloring agent.

Magnesium chloride ($MgCl_2$), at the point in time when 1 mole of it as a pure substance dissolves in water to have a concentration of 1 $molkg^{-1}$, gives a standard enthalpy of dissolution of $-159.8$ $\Delta solH/KJmol^{-1}$; this compound is a food additive approved as a coagulant for tofu (soybean curd).

In addition, magnesium chloride ($MgCl_2$), at the point in time when 1 mole of it as a pure substance incorporates 6 moles of water to form a hydrate, gives an enthalpy of hydration of $-138.53$ $\Delta hydH/KJmol^{-1}$; this compound is a food additive approved as a coagulant for tofu (soybean curd).

Sodium sulfite ($Na_2SO_3$), at the point in time when 1 mole of it as a pure substance dissolves in water to have a concentration of 1 $molkg^{-1}$, gives a standard enthalpy of dissolution of $-15.07$ $\Delta solH/KJmol^{-1}$; this compound is a food additive approved as a coloring agent.

Sodium phosphate ($Na_3PO_4$), at the point in time when 1 mole of it as a pure substance dissolves in water to have a concentration of 1 $molkg^{-1}$, gives a standard enthalpy of dissolution of $-80.50$ $\Delta solH/KJmol^{-1}$; this compound is a food additive approved as a binder for ham, sausage, etc.

Sodium carbonate ($Na_2CO_3$), at the point in time when 1 mole of it as a pure substance dissolves in water to have a concentration of 1 $molkg^{-1}$, gives a standard enthalpy of dissolution of $-26.7$ $\Delta solH/KJmol^{-1}$.

In addition, sodium carbonate ($Na_2CO_3$), at the point in time when 1 mole of it as a pure substance incorporates 1 mole of water to form a hydrate, gives an enthalpy of hydration of $-14.14$ $\Delta solH/KJmol^{-1}$.

In addition, sodium carbonate ($Na_2CO_3$), at the point in time when 1 mole of it as a pure substance incorporates 7 moles of water to form a hydrate, gives an enthalpy of hydration of $-68.5$ $\Delta solH/KJmol^{-1}$.

In addition, sodium carbonate ($Na_2CO_3$), at the point in time when 1 mole of it as a pure substance incorporates 10 moles of water to form a hydrate, gives an enthalpy of hydration of $-91.2$ $\Delta solH/KJmol^{-1}$.

The exothermic agent of the present invention which consists of the aluminum powder, the calcium oxide powder and the aforementioned third component is packed into a bag of water-permeable nonwoven fabric, Japanese paper, synthetic paper or the like, which in turn is wrapped in a bag of a water-impermeable material such as aluminum foil to prevent the calcium oxide powder from undergoing a reaction by absorbing the moisture in the air. To use the exothermic agent of the present invention, it may be put into a suitable container as it is packed in the bag of nonwoven fabric or the like and then water is added in an amount not more than twice the mass of the exothermic agent.

Furthermore, the exothermic agent of the present invention may, prior to use, be built into vessels for cooking emergency or portable rations. Cooking vessels into which the exothermic agent of the present invention can be built are of various types that are made of synthetic resins such as polyethylene, polypropylene, polystyrene, polyvinylidene chloride, polyethylene terephthalate, polymethyl methacrylate, nylon and polomethylpentene, synthetic resin treated aluminum, synthetic resin treated paper, metal cans, bins, and combinations of metals and synthetic resins.

Hereinafter, the present invention is described specifically by means of Examples and Comparative Examples.

[Calcium Oxide Powder Used]

The smaller the particle size of the calcium oxide to be used in the present invention, the more improved is the reaction rate but, on the other hand, agglomeration occurs or it becomes difficult to handle; therefore, in the present invention, a calcium oxide powder having an average particle size of 75 μm to 150 μm is used. Various types of calcium oxide are currently available on the market but in the following Examples and Comparative Examples, the calcium oxide powder manufactured by Yuko Kogyou Co., Ltd. was used.

[Aluminum Powders Used]

In the Examples, aluminum powders having the particle size characteristics of the following type 1 and type 2 were used as a 1:2 mixture.

Type 1: Aluminum content or purity, 99.7% and more; apparent density, 1.16; average particle size, 30 to 60 μm; particle size distribution, 45 μm pass (75.5-78.8%), 45-75 μm (20.6-23.8%), and 75 μm and larger (0.5-0.7%); Type 2: Aluminum content or purity, 99.7% and more; apparent density, 1.036; average particle size, 35 to 45 μm; particle size distribution, 45 μm pass (66.3%), 45 μm (24.2%), 63 μm (7.8%), 75 μm (1.4%), and 106 μm (0.3%).

[Nonwoven Fabric Used]

Having a basis weight of 60 $g/m^2$, a thickness of 0.14 mm, air permeability of 20 $cc/cm^2 \cdot sec$, and a heat sealing strength of 6.0 kg.

[Calorimeter Used]

To accommodate the masses of the exothermic agents under test (5 g, 10 g, and 20 g), reaction vessels in the form of a rectangular prism, with an open top and having the specifications indicated below, were fabricated from a 2-mm thick sheet of stainless steel 304. Using the same 2-mm thick sheet of stainless steel 304, lids were fabricated such that they would close the open tops of the vessels. Each lid was provided with a hole through which to insert a water injection pipe, a hole ($\phi=1.5$ mm) through which to insert a temperature-sensitive sensor, and a vapor venting hole ($\phi=1$ mm). The water injection pipe was fitted with a funnel on the top and it was also fitted with a water injection valve at a specified position. The temperature-sensitive sensor, being set in such a way that the temperature of the vapor generated could be measured at 5-second intervals, was connected to a measuring lead wire, which in turn was connected to an automatic temperature recording apparatus (personal computer). The automatic temperature recording apparatus was so adapted that the changes in time, room temperature and the exothermic agents under test (in two units) could be recorded to provide not only a continuous graph but also digital data at 5-second intervals.

To use the thus constructed calorimeter, the first thing to do was to fit each lid with the water injection pipe and the temperature-sensitive sensor. The setting was such that the tip of the sensor would be at a specified distance from the bottom of the vessel in accordance with the mass of the exothermic agent of interest (5 g, 10 g, or 20 g). Then, the exothermic agent to be measured was placed on the bottom of the vessel and, with a 1.5-mm thick silicone packing being inserted, the opening of the vessel was closed and fastened with a fastener on the vessel.

The sizes of the vessels, their capacities, and the distances from their bottoms to the sensor are indicated below for the masses of the respective exothermic agents (5 g, 10 g, and 20 g).

1. Reaction vessel for calorimeter in the case where the exothermic agent weighed 5 g to 10 g:

Size: 60 mm (length)×95 mm (width)×80 mm (height)

Capacity: 456 mL

Distance from the bottom of the reaction vessel to the sensor: 35 mm

2. Reaction vessel for calorimeter in the case where the exothermic agent weighed 10 g to 20 g:
Size: 60 mm (length)×95 mm (width)×80 mm (height)
Capacity: 456 mL
Distance from the bottom of the reaction vessel to the sensor: 35 mm 3. Reaction vessel for calorimeter in the case where the exothermic agent weighed more than 20 g:
Size: 100 mm (length)×150 mm (width)×110 mm (height)
Capacity: 1650 mL
Distance from the bottom of the reaction vessel to the sensor: 40 mm

EXAMPLE 1

One gram of an aluminum powder having the aforementioned type 1 of particle size distribution was uniformly mixed with 2 g of an aluminum powder having the aforementioned type 2 of particle size distribution. The overall particle size distribution of the resulting mixed aluminum powder was measured with an automatic particle size analyzer of Shimadzu Corporation [SALD-3100 (SALD-3100-WJA1:V1:00)] and the relative particle quantity (%) versus particle size (μm) profile is shown by -Δ- in FIG. 1. The 1:2 mixed aluminum powder of interest had a median diameter of 43.046, a modal diameter of 41.081, a mean value of 43.302, a standard deviation of 0.285, a 10.0% D of 18.522, a 50.0% D of 43.046, and a 90.0% D of 104.515.

COMPARATIVE EXAMPLE 1

In the next place, the aluminum powder described in Patent Document 1 which had such a particle size distribution that a −330 mesh (−45 μm) was 40 to 60%, a +330 mesh (+45 μm) was 15 to 30%, a +235 mesh (+63 μm) was 15%>, and a +200 mesh (+75 μm) was 10%> was measured for its particle size distribution with an automatic particle size analyzer of Shimadzu Corporation [SALD-3100 (SALD-3100-WJA1:V1:00)] and the relative particle quantity (%) versus particle size (μm) profile is shown by -○- in FIG. 1. The aluminum powder of that patent document had a median diameter of 57.674, a modal diameter of 63.792, a mean value of 58.929, a standard deviation of 0.314, a 10.0% D of 23.276, a 50.0% D of 57.674, and a 90.0% D of 157.331.

[Discussion 1]

By referring to FIG. 1 which shows Example 1 together with Comparative Example 1, one can see that the peak of relative particle quantity was at 30-40 μm in Example 1 whereas in Comparative Example 1, the peak was in the neighborhood of 70 μm. The present inventors therefore calculated the integrated differential values (%) for particular particle sizes (μm) in Example 1 and Comparative Example 1. The top five scores of the results obtained are enumerated below: in Example 1, (1) 45.859 μm accounted for 14.425%, (2) 57.146 μm accounted for 13.721 μm, (3) 36.801 μm accounted for 11.627%, (4) 71.211 μm accounted for 10.634%, and (5) 29.532 μm accounted for 10.208%, whereas in Comparative Example 1, (1) 71.211 μm accounted for 13.791%, (2) 57.146 μm accounted for 13.501%, (3) 45.859 μm accounted 10.855%, (4) 88.739 μm accounted for 10.438%, and (5) 36.801 pa accounted for 8.079%. From these results, it can be seen that Comparative Example 1, namely, the aluminum powder described in Patent Document 1 contained less of the particles with smaller sizes (50 μm and less) that would contribute to increasing the reaction rate whereas Example 1 contained more of the particles with smaller sizes (50 μm and less) that would contribute to increasing the reaction rate.

From the results of Example 1 and Comparative Example 1, it was verified that the 1:2 mixed aluminum powder used in the present invention, in which an aluminum powder having such a particle size distribution that a particle size of 45 μm pass was 70.0 to 80.0% and a particle size of 45 to 75 μm was 20.0 to 30.0% and an aluminum powder having such a particle size distribution that a particle size of 45 μm pass was 60 to 70%, a particle size of 45 μm was 20 to 30%, a particle size of 63 μm was 7 to 10% and a particle size of 75 μm was 1.0 to 2.0% were mixed at a ratio of 1:2 had an entirely different overall particle size distribution than the aluminum powder described in Patent Document 1 which had such a particle size distribution that a −330 mesh (−45 μm) was 40 to 60%, a +330 mesh (+45 μm) was 15 to 30%, a +235 mesh (+63 μm) was 15%>, and a +200 mesh (+75 μm) was 10%>.

EXAMPLE 2

Figure 2:
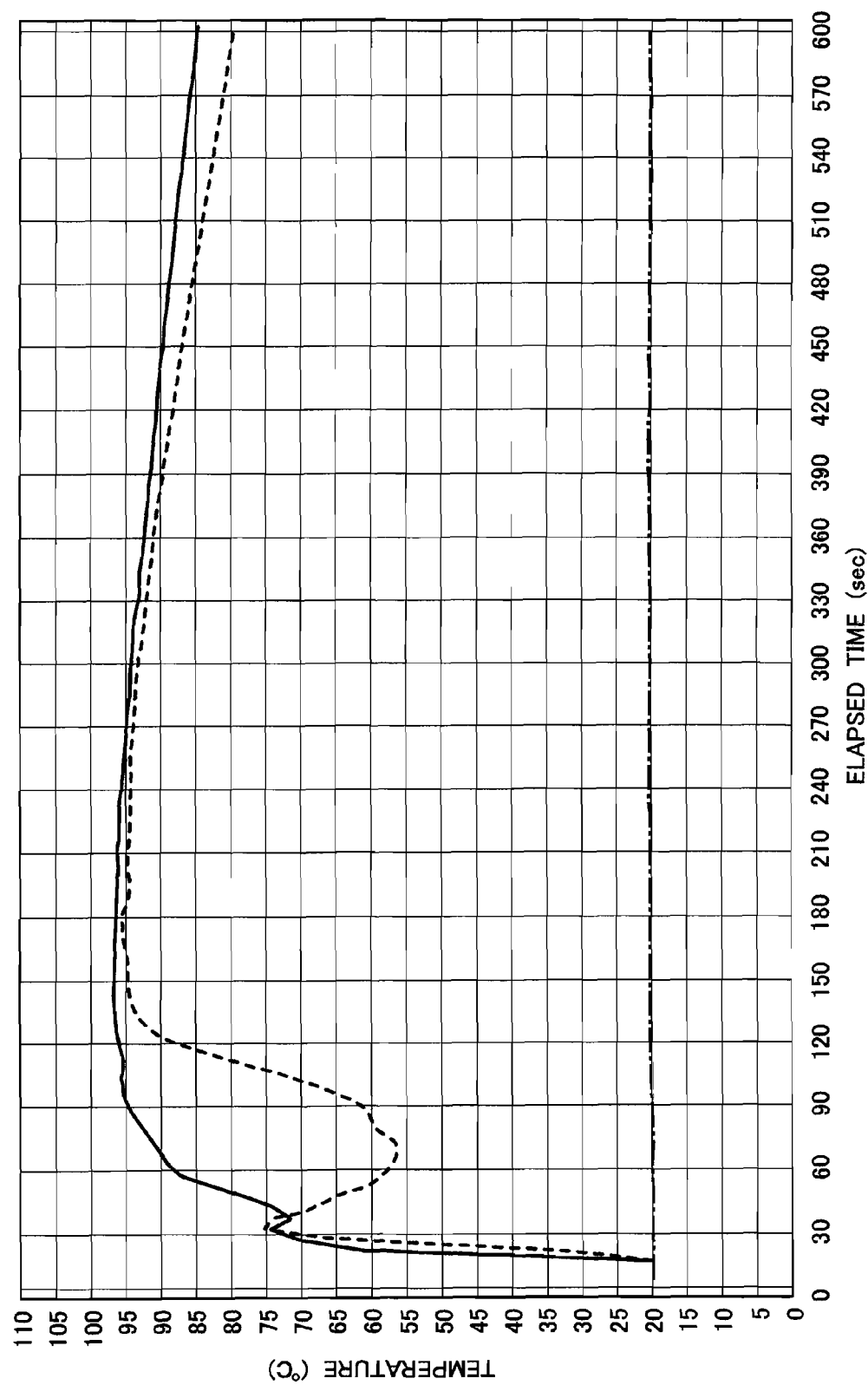
FIG. 2 is a graph showing Example 2 and Comparative Example 2.

Ten grams of an exothermic agent consisting of 6.950 g of a mixed aluminum powder consisting of 2.317 g of type 1 aluminum powder and 4.634 g of type 2 aluminum powder (the mass of type 1 aluminum powder to the mass of type 2 aluminum powder=1:2, accounting for 69.5% of the mass of the exothermic agent) and 3.05 g of calcium oxide (accounting for 30.5% of the mass of the exothermic agent) was packed into a nonwoven fabric bag measuring 63 mm (width)×60 mm (length)×5 mm (thickness), placed on the bottom of the above-described reaction vessel for calorimeter for use with 10 g-20 g, closed with the lid, injected with 20 mL of reaction water through the water injection pipe, whereby an exothermic reaction was caused to generate steam; the change in the temperature of the steam that occurred from zero to 600 seconds was measured with the automatic temperature measuring apparatus and recorded graphically. The result is shown in FIG. 2 by a solid line. The alternate long and short dash line in FIG. 2 extending near at 20° C. refers to room temperature.

COMPARATIVE EXAMPLE 2

Ten grams of an exothermic agent consisting of 7 g of type 1 aluminum powder and 3 g of calcium oxide was packed into a nonwoven fabric bag measuring 63 mm (width)×60 mm (length)×5 mm (thickness) and the change in the temperature of the steam that was generated by the same technique as in Example 2 was measured with the automatic temperature measuring apparatus and recorded graphically. The result is shown in FIG. 2 by a dotted line. The alternate long and short dash line in FIG. 2 extending near at 20° C. refers to room temperature.

[Discussion 2]

From the results shown in FIG. 2, the following facts are understood.

1. Example 2 using the mixed aluminum powder consisting of type 1 aluminum powder and type 2 aluminum powder at a mass ratio of 1:2 generally exhibited a better exothermic behavior than Comparative Example 2 using type 1 aluminum powder independently.

2. Example 2 used 2.317 g of type 1 aluminum powder and 4.634 g of type 2 aluminum powder. In other words, the mass ratio of type 1 aluminum powder to type 2 aluminum powder was 1:2. They accounted for 69.5% of the total mass of the exothermic agent. This verified the criticality of "less than 70%" which is the upper limit of the content of the 1:2 mixed aluminum powder in the invention recited in claim 1.

3. In contrast, calcium oxide was used in an amount of 3.05 g, i.e., accounting for 30.5% of the total mass of the exothermic agent. This verified the criticality of "more than 30%" which is the lower limit of the content of calcium oxide in the invention recited in claim 1.

EXAMPLE 3

Figure 3:
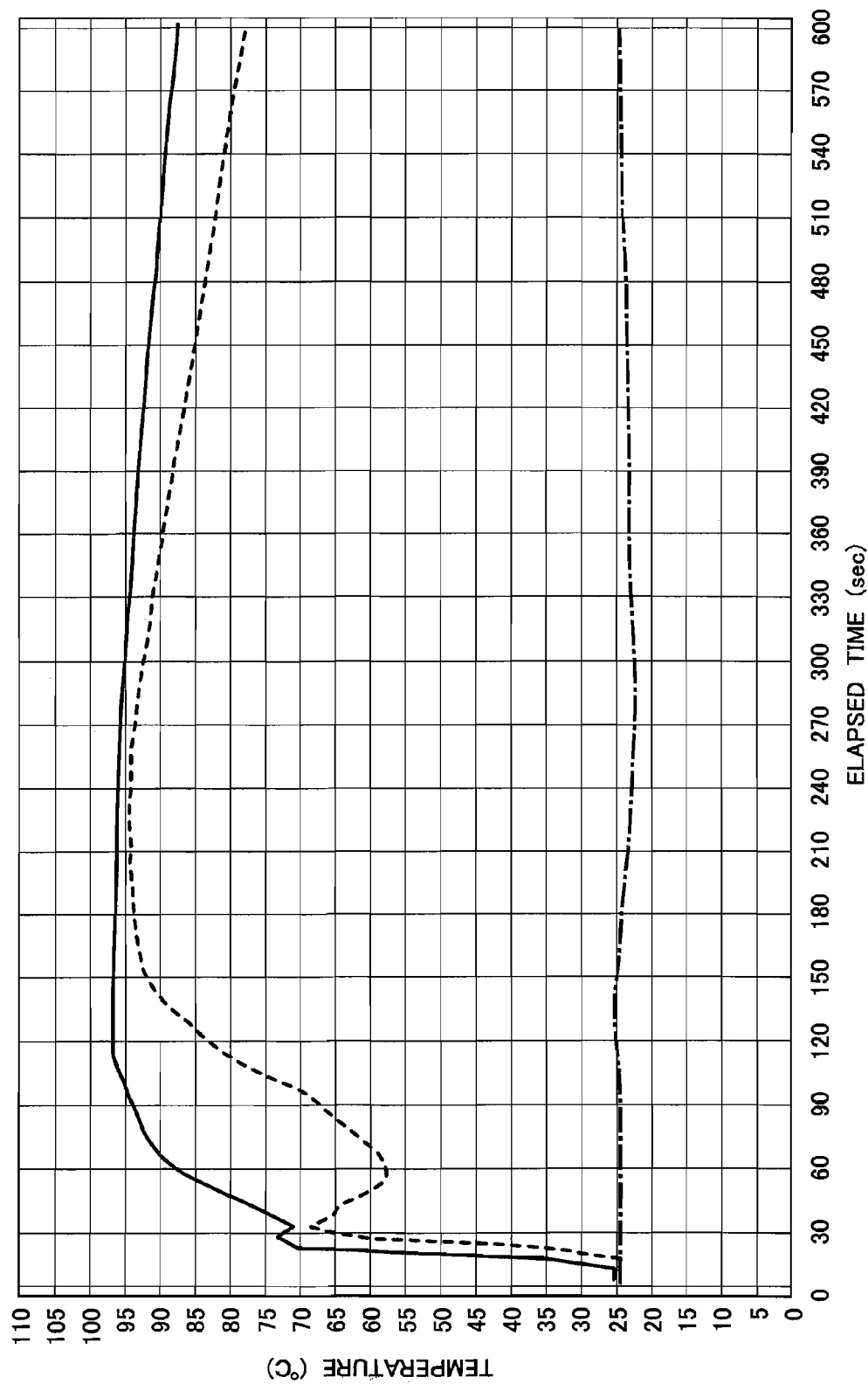
FIG. 3 is a graph showing Example 3 and Comparative Example 3.

Ten grams of an exothermic agent consisting of 6.05 g of a mixed aluminum powder consisting of 2.017 g of type 1 aluminum powder and 4.033 g of type 2 aluminum powder (the mass of type 1 aluminum powder to the mass of type 2 aluminum powder=1:2, accounting for 60.5% of the mass of the exothermic agent) and 3.95 of calcium oxide (accounting for 39.5% of the mass of the exothermic agent) were packed into a nonwoven fabric bag measuring 63 mm (width)×60 mm (length)×5 mm (thickness) and the change in the temperature of the steam that was generated by the same technique as in Example 2 was measured with the automatic temperature measuring apparatus and recorded graphically. The result is shown in FIG. 3 by a solid line. The alternate long and short dash line in FIG. 3 extending between 20-25° C. refers to room temperature.

COMPARATIVE EXAMPLE 3

Ten grams of an exothermic agent consisting of 7 g of type 2 aluminum powder and 3 g of calcium oxide was packed into a nonwoven fabric bag measuring 63 mm (width)×60 mm (length)×5 mm (thickness) and the change in the temperature of the steam that was generated by the same technique as in Example 2 was measured with the automatic temperature measuring apparatus and recorded graphically. The result is shown in FIG. 3 by a dotted line. The alternate long and short dash line in FIG. 3 extending between 20-25° C. refers to room temperature.

[Discussion 3]

From the results shown in FIG. 3, the following facts are understood.

1. Example 3 using the mixed aluminum powder consisting of type 1 aluminum powder and type 2 aluminum powder at a mass ratio of 1:2 generally exhibited a better exothermic behavior than Comparative Example 3 using type 2 aluminum powder independently.

2. Example 3 used 2.017 g of type 1 aluminum powder and 4.033 g of type 2 aluminum powder. In other words, the mass ratio of type 1 aluminum powder to type 2 aluminum powder was 1:2. They accounted for 60.5% of the total mass of the exothermic agent. This verified the criticality of "not less than 60%" which is the lower limit of the content of the 1:2 mixed aluminum powder in the invention recited in claim 1.

3. In contrast, calcium oxide was used in an amount of 3.95 g, i.e., accounting for 39.5% of the total mass of the exothermic agent. This verified the criticality of "not more than 40%" which is the upper limit of the content of calcium oxide in the invention recited in claim 1.

EXAMPLE 4

Figure 4:
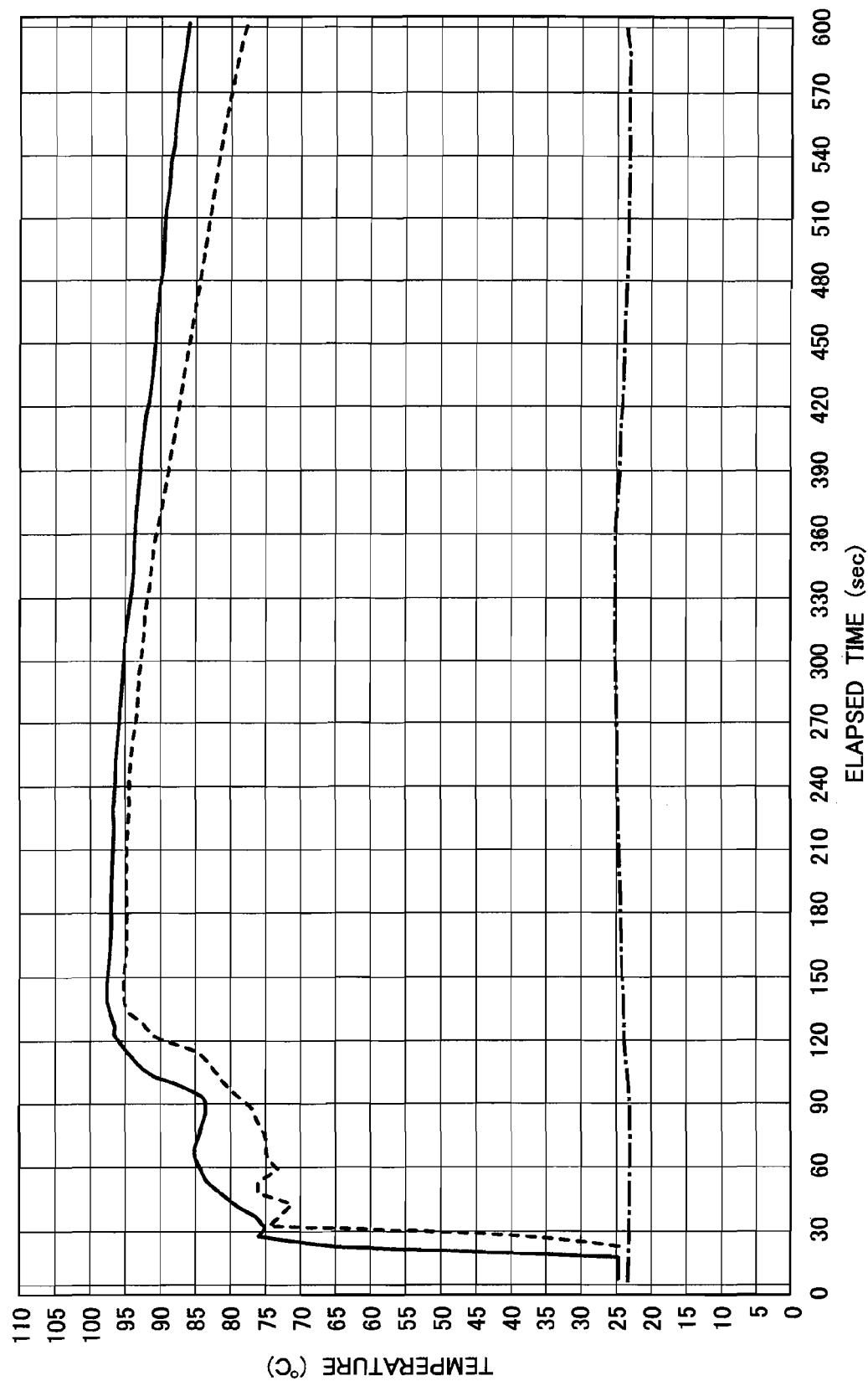
FIG. 4 is a graph showing Example 4 and Comparative Example 4.

Five grams of an exothermic agent consisting of 3.025 g of a mixed aluminum powder consisting of 1.008 g of type 1 aluminum powder and 2.017 g of type 2 aluminum powder (the mass of type 1 aluminum powder to the mass of type 2 aluminum powder=1:2, accounting for 60.5% of the mass of the exothermic agent) and 1.975 g of calcium oxide (accounting for 39.5% of the mass of the exothermic agent) were packed into a nonwoven fabric bag measuring 63 mm (width)×50 mm (length)×5 mm (thickness) and the change in the temperature of the steam that was generated by the same technique as in Example 2 was measured with the automatic temperature measuring apparatus and recorded graphically. The result is shown in FIG. 4 by a solid line. The alternate long and short dash line in FIG. 4 extending between 20-25° C. refers to room temperature.

COMPARATIVE EXAMPLE 4

Five grams of an exothermic agent consisting of 3.00 g of the aluminum described in Patent Document 1 and 2.00 g of calcium oxide was packed into a nonwoven fabric bag measuring 63 mm (width)×50 mm (length)×5 mm (thickness) and the change in the temperature of the steam that was generated by the same technique as in Example 2 was measured with the automatic temperature measuring apparatus and recorded graphically. The result is shown in FIG. 4 by a dotted line. The alternate long and short dash line in FIG. 4 extending between 20-25° C. refers to room temperature.

[Discussion 4]

From the results shown in FIG. 4, the following facts are understood.

1. The exothermic agent of Example 4 which consisted of 3.025 g of the mixed aluminum powder consisting of 1.008 g of type 1 aluminum powder and 2.017 g of type 2 aluminum powder plus 1.975 g of calcium oxide was in only a small amount giving a total mass of 5 g and nevertheless it generally exhibited a better exothermic behavior than Comparative Example 4 using 5 g of the exothermic agent described in Patent Document 1.

2. Example 4 used 1.008 g of type 1 aluminum powder and 2.017 g of type 2 aluminum powder. In other words, the mass ratio of type 1 aluminum powder to type 2 aluminum powder was 1:2. They accounted for 60.5% of the total mass of the exothermic agent. This verified that even when the total mass of the exothermic agent was as small as 5 g, "not less than 60%" which is the lower limit of the content of the 1:2 mixed aluminum powder in the invention recited in claim 1 is critical.

3. In contrast, calcium oxide was used in an amount of 1.975 g, i.e., accounting for 39.5% of the total mass of the exothermic agent. This verified that even when the total mass of the exothermic agent was as small as 5 g, "not more than 40%" which is the upper limit of the content of calcium oxide in the invention recited in claim 1 is critical.

EXAMPLE 5

Five grams of an exothermic agent consisting of 3.475 g of a mixed aluminum powder consisting of 1.158 g of type 1 aluminum powder and 2.316 g of type 2 aluminum powder (the mass of type 1 aluminum powder to the mass of type 2 aluminum powder=1:2, accounting for 69.5% of the mass of the exothermic agent) and 1.525 g of calcium oxide (accounting for 30.5% of the mass of the exothermic agent) was packed into a nonwoven fabric bag measuring 63 mm (width)×50 mm (length)×5 mm (thickness) and the change in the temperature of the steam that was generated by the same technique as in Example 2 was measured with the automatic temperature measuring apparatus and recorded graphically.

Figure 5:
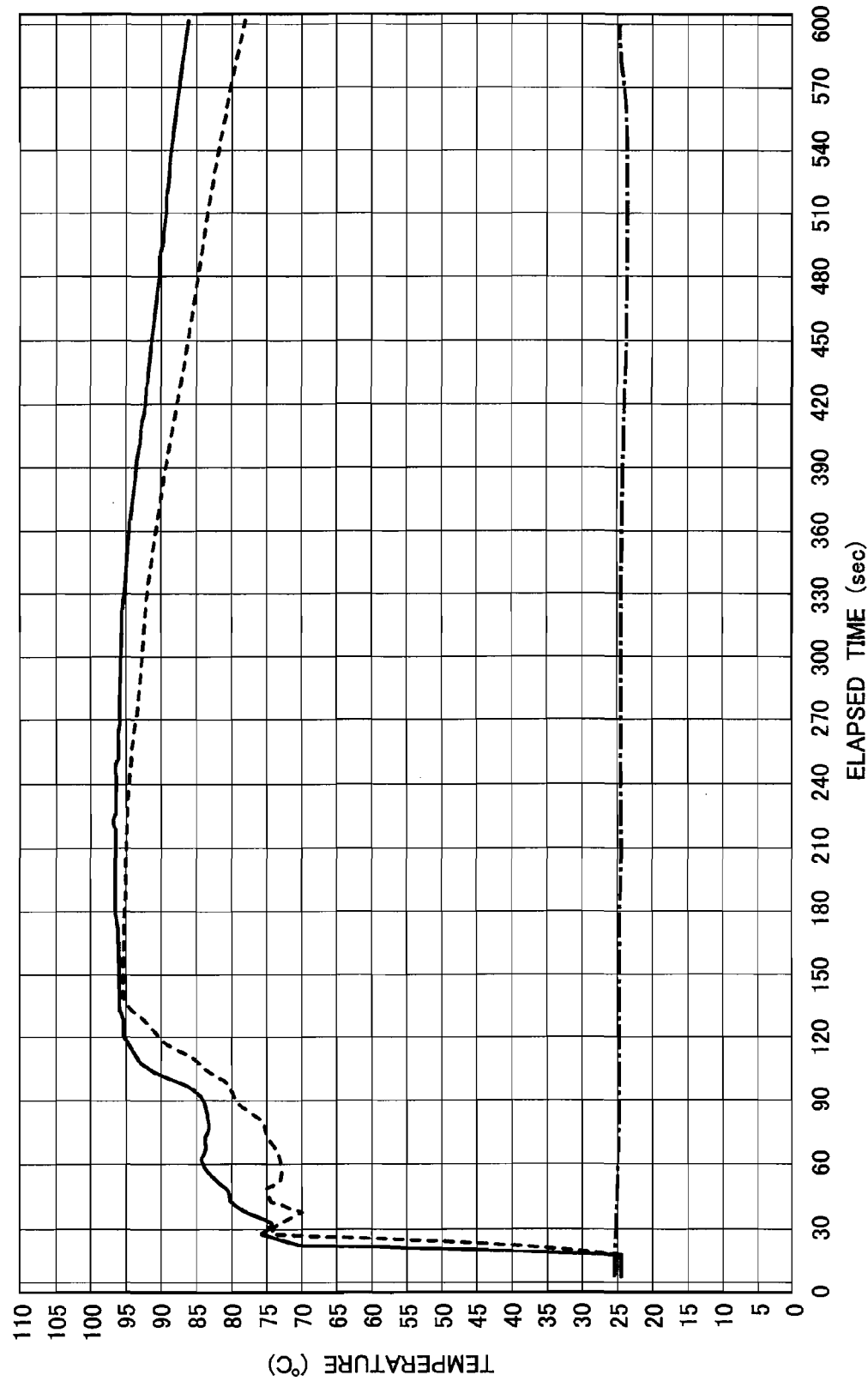
FIG. 5 is a graph showing Example 5 and Comparative Example 5.

The result is shown in FIG. 5 by a solid line. The alternate long and short dash line in FIG. 5 extending between 20-25° C. refers to room temperature.

COMPARATIVE EXAMPLE 5

Five grams of an exothermic agent consisting of 3.00 g of the aluminum described in Patent Document 1 and 2.00 g of calcium oxide was packed into a nonwoven fabric bag measuring 63 mm (width)×50 mm (length)×5 mm (thickness) and the change in the temperature of the steam that was generated by the same technique as in Example 2 was measured with the automatic temperature measuring apparatus and recorded graphically. The result is shown in FIG. 5 by a dotted line. The alternate long and short dash line in FIG. 5 extending between 20-25° C. refers to room temperature.

[Discussion 5]

From the results shown in FIG. 5, the following facts are understood.

1. The exothermic agent of Example 5 which consisted of 3.475 g of the mixed aluminum powder consisting of 1.158 g of type 1 aluminum powder and 2.316 g of type 2 aluminum powder plus 1.525 g of calcium oxide was in only a small amount giving a total mass of 5 g and nevertheless it generally exhibited a better exothermic behavior than Comparative Example 5 using 5 g of the exothermic agent described in Patent Document 1.

2. Example 5 used 1.158 g of type 1 aluminum powder and 2.316 g of type 2 aluminum powder. In other words, the mass ratio of type 1 aluminum powder to type 2 aluminum powder was 1:2. They accounted for 69.5% of the total mass of the exothermic agent. This verified that even when the total mass of the exothermic agent was as small as 5 g, "less than 70%" which is the upper limit of the content of the 1:2 mixed aluminum powder in the invention recited in claim 1 is critical.

3. In contrast, calcium oxide was used in an amount of 1.52 g, i.e., accounting for 30.5% of the total mass of the exothermic agent. This verified that even when the total mass of the exothermic agent was as small as 5 g, "more than 30%" which is the lower limit of the content of calcium oxide in the invention recited in claim 1 is critical.

EXAMPLE 6

Figure 6:
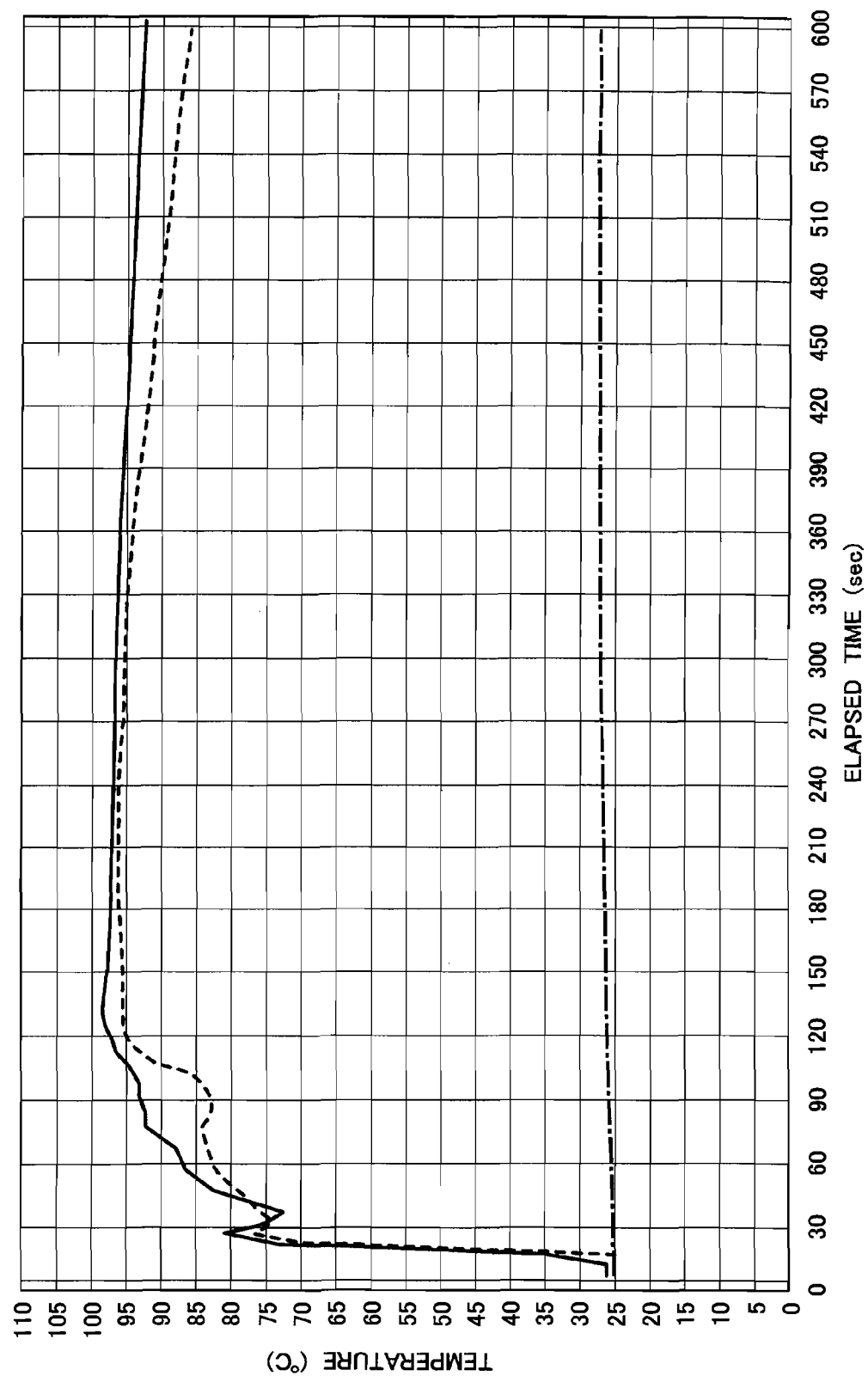
FIG. 6 is a graph showing Example 6 and Example 7.

To 5 g of the same exothermic agent as used in Example 4, sodium carbonate was added in 0.5 g (accounting for 10% of the total mass of the exothermic agent) to give a total weight of 5.5 g and the resulting exothermic agent was packed into a nonwoven fabric bag measuring 63 mm (width)×50 mm (length)×5 mm (thickness) and the change in the temperature of the steam that was generated by the same technique as in Example 2 was measured with the automatic temperature measuring apparatus and recorded graphically. The result is shown in FIG. 6 by a solid line. The alternate long and short dash line in FIG. 6 extending between 25-30° C. refers to room temperature.

EXAMPLE 7

The procedure of Example 6 was repeated except that there was used 5 g of an exothermic agent consisting of 3 g of a mixed aluminum powder consisting of 1 g of type 1 aluminum powder and 2 g of type 2 aluminum powder plus 2 g of calcium oxide. The result is shown in FIG. 6 by a dotted line. The alternate long and short dash line in FIG. 6 extending between 25-30° C. refers to room temperature.

[Discussion 7]

From the results shown in FIG. 6, it was verified that taken overall, Example 6 which had sodium carbonate added in 0.5 g (i.e., accounting for 10% of total mass of the exothermic agent) exhibited a by far superior exothermic behavior than Example 7 which did not incorporate sodium carbonate.

EXAMPLE 8

Figure 7:
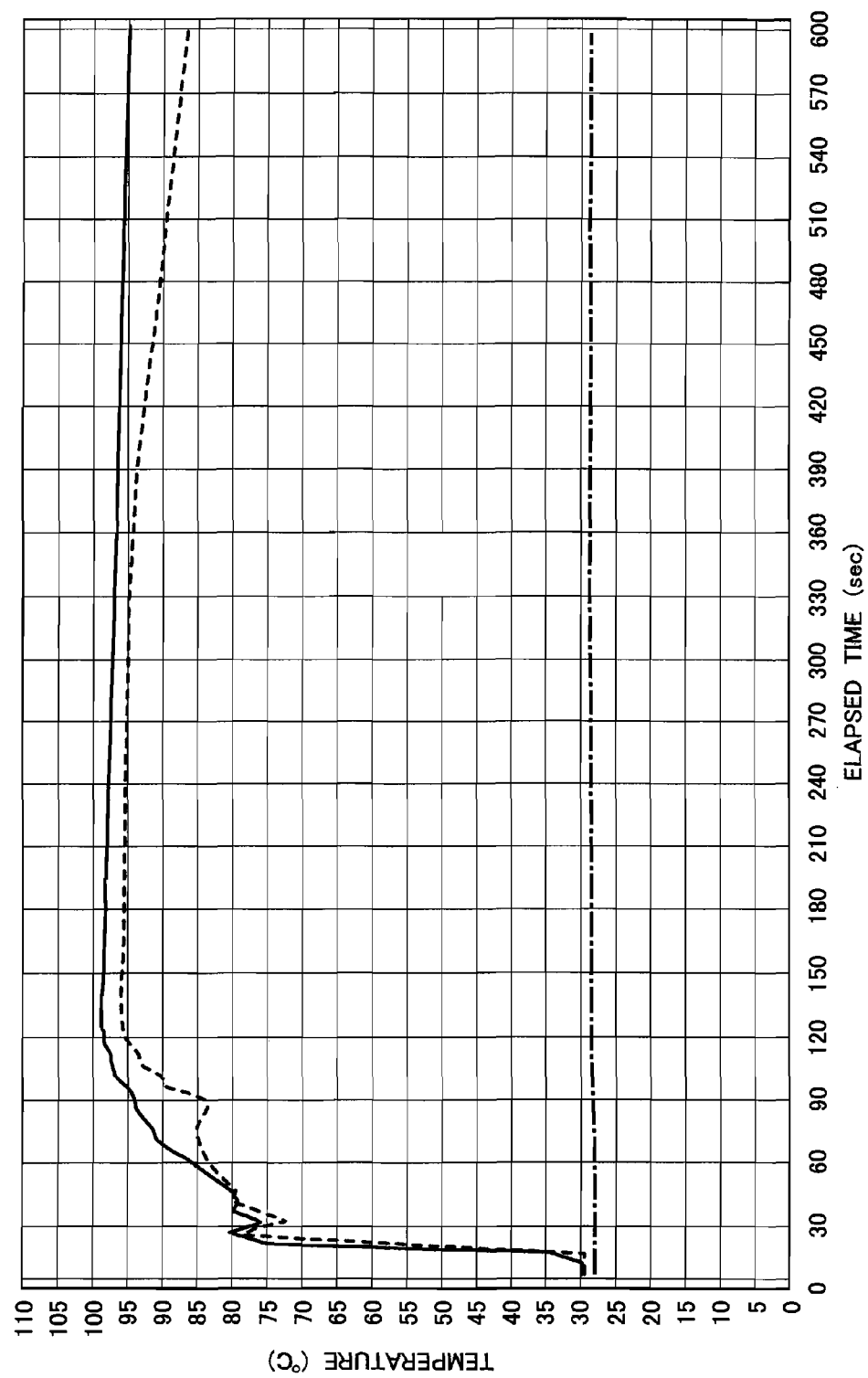
FIG. 7 is a graph showing Example 8 and Example 9.

To 5 g of the same exothermic agent as used in Example 5, sodium sulfite was added in 0.4 g (accounting for 8% of the total mass of the exothermic agent) to give a total weight of 5.4 g and an experiment was conducted by the same procedure as in Example 6. The result obtained is shown in FIG. 7 by a solid line. The alternate long and short dash line in FIG. 7 extending between 25-30° C. refers to room temperature.

EXAMPLE 9

The procedure of Example 6 was repeated except that there was used 5 g of an exothermic agent consisting of 3 g of a 1:2 mixed aluminum powder consisting of 1 g of type 1 aluminum powder and 2 g of type 2 aluminum powder plus 2 g of calcium oxide. The result obtained is shown in FIG. 7 by a dotted line. The alternate long and short dash line in FIG. 7 extending between 25-30° C. refers to room temperature.

[Discussion 8]

As can be seen from the results shown in FIG. 7, after the start of heat generation and up to about 180 seconds from time zero, Example 8 incorporating sodium sulfite exhibited a by far superior exothermic behavior; and thereafter up to 600 seconds, Example 8 experienced a temperature drop while maintaining higher temperatures than Example 9 which incorporated no sodium sulfite and at the point in time of 600 seconds, Example 8 was at about 90° C. whereas Example 9 incorporating no sodium sulfite was at about 87° C.

EXAMPLE 10

Figure 8:
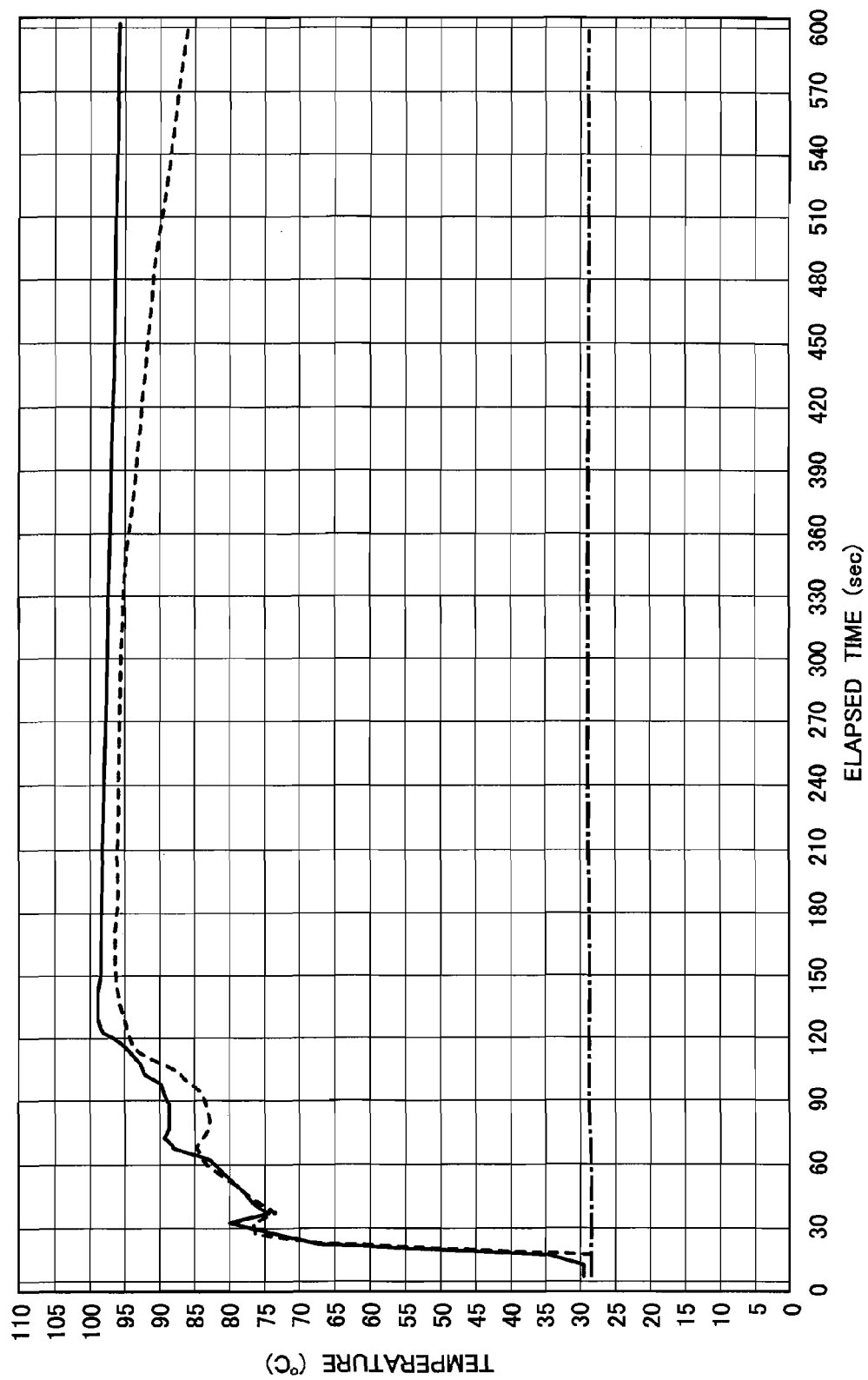
FIG. 8 is a graph showing Example 10 and Example 11.

To 5 g of the same exothermic agent as used in Example 5, magnesium chloride was added in 0.3 g (accounting for 6% of the total mass of the exothermic agent) to give a total weight of 5.3 g and an experiment was conducted by the same procedure as in Example 6. The result obtained is shown in FIG. 8 by a solid line. The alternate long and short dash line in FIG. 8 extending between 25-30° C. refers to room temperature.

EXAMPLE 11

The procedure of Example 6 was repeated except that there was used 5 g of an exothermic agent consisting of 3 g of a 1:2 mixed aluminum powder consisting of 1 g of type 1 aluminum powder and 2 g of type 2 aluminum powder plus 2 g of calcium oxide. The result obtained is shown in FIG. 8 by a dotted line. The alternate long and short dash line in FIG. 8 extending between 25-30° C. refers to room temperature.

[Discussion 9]

As can be seen from the results shown in FIG. 8, up to about 120 seconds after the start of heat generation, no significant difference was observed between Example 10 which incorporated magnesium chloride and Example 11 which incorporated no magnesium chloride; however, in the period between 120 seconds and 600 seconds, Example 10 experienced a temperature drop while maintaining higher temperatures than Example 11 which incorporated no magnesium chloride and at the point in time of 600 seconds, Example 10 was at about 96° C. whereas Example 11 incorporating no sodium sulfite was at about 87° C.

EXAMPLE 12

Figure 9:
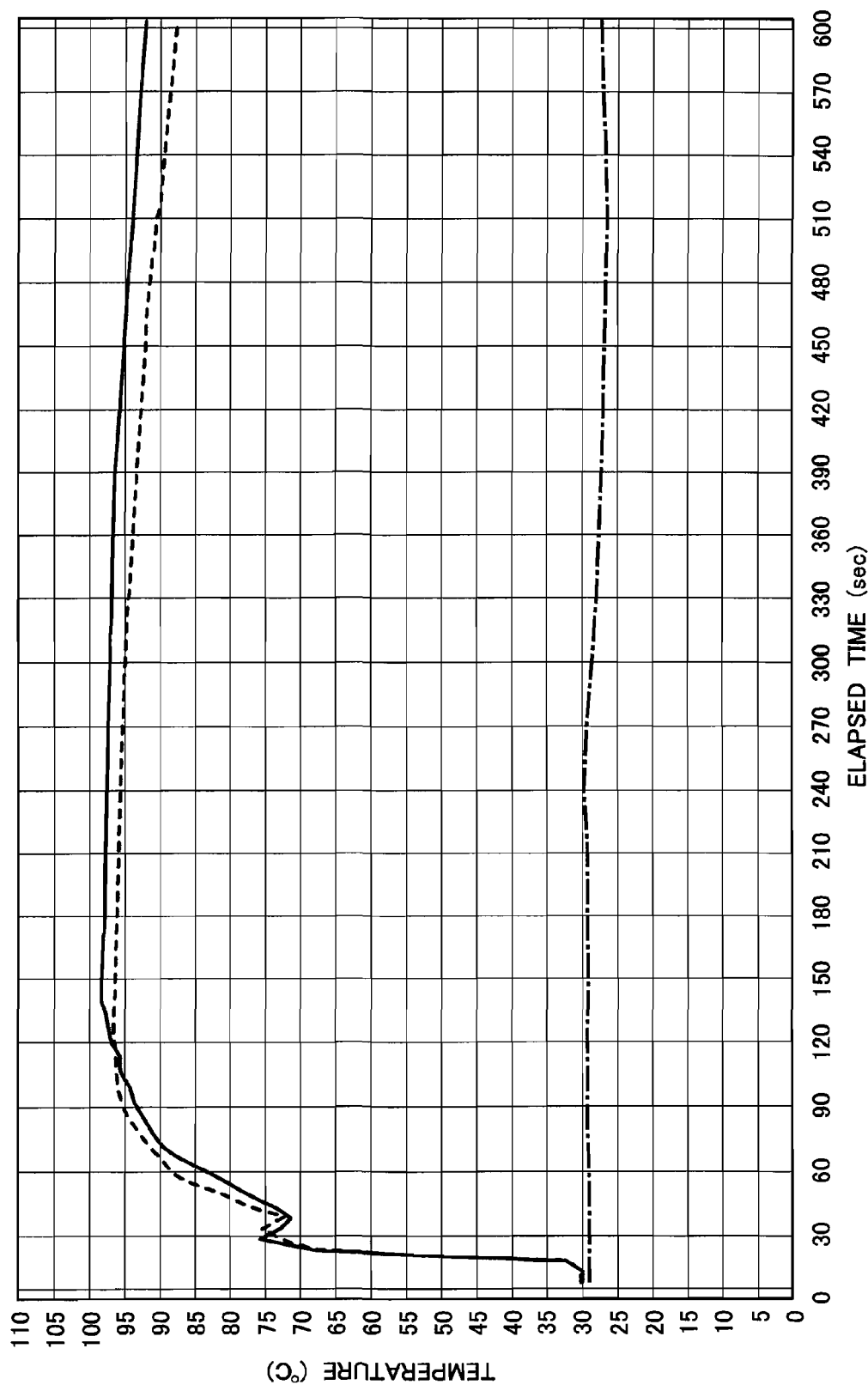
FIG. 9 is a graph showing Example 12 and Example 13.

To 10 g of the same exothermic agent as used in Example 2, calcium carbonate was added in 0.5 g (accounting for 5% of the total mass of the exothermic agent) to give a total weight of 10.5 g and an experiment was conducted by the same procedure as in Example 6 except that 20 mL of water was added and that there was used the reaction vessel for the calorimeter for use with 10-20 g of the exothermic agent. The result obtained is shown in FIG. 9 by a solid line. The alternate long and short dash line in FIG. 9 extending between 20-25° C. refers to room temperature.

EXAMPLE 13

The procedure of Example 12 was repeated except that there was used 10 g of an exothermic agent consisting of 6 g of a 1:2 mixed aluminum powder consisting of 2 g of type 1 aluminum powder and 4 g of type 2 aluminum powder plus 4 g of calcium oxide. The result obtained is shown in FIG. 9 by a dotted line. The alternate long and short dash line in FIG. 9 extending between 20-25° C. refers to room temperature.

[Discussion 10]

As can be seen from the results shown in FIG. 9, up to about 210 seconds after the start of heat generation, Example 12 which incorporated calcium carbonate alternately became higher or lower than Example 13 which incorporated no magnesium chloride and no significant difference was observed between the two; however, in the period between 1120 seconds and 600 seconds, Example 12 experienced a temperature drop while maintaining higher temperatures than Example 13 which incorporated no calcium carbonate and at the point in time of 600 seconds, Example 12 was at about 92° C. whereas Example 13 incorporating no calcium carbonate was at about 87° C.

EXAMPLE 14

Figure 10:
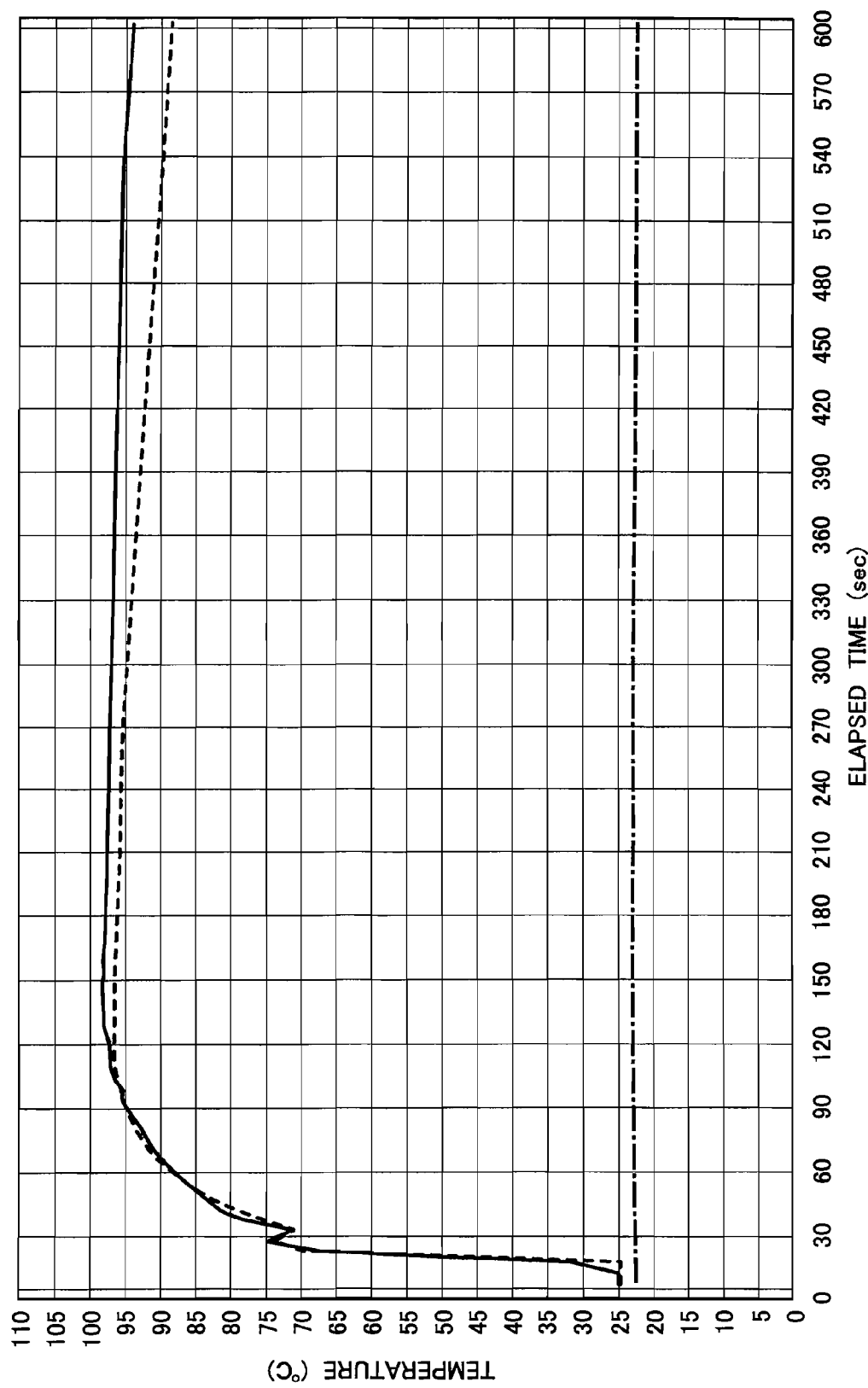
FIG. 10 is a graph showing Example 14 and Example 15.

To 10 g of the same exothermic agent as used in Example 3, ferrous sulfate was added in 0.6 g (accounting for 6% of the total mass of the exothermic agent) to give a total weight of 10.6 g and an experiment was conducted by the same procedure as in Example 6 except that 20 mL of water was added and that there was used the reaction vessel for the calorimeter for use with 10-20 g of the exothermic agent. The result obtained is shown in FIG. 10 by a solid line. The alternate long and short dash line in FIG. 10 extending between 20-25° C. refers to room temperature.

EXAMPLE 15

The procedure of Example 14 was repeated except that there was used 10 g of an exothermic agent consisting of 6 g of a 1:2 mixed aluminum powder consisting of 2 g of type 1 aluminum powder and 4 g of type 2 aluminum powder plus 4 g of calcium oxide. The result obtained is shown in FIG. 10 by a dotted line. The alternate long and short dash line in FIG. 10 extending between near 25° C. refers to room temperature.

[Discussion 11]

As can be seen from the results shown in FIG. 10, up to about 240 seconds after the start of heat generation, no significant difference was observed between Example 14 which incorporated ferrous sulfate and Example 15 which incorporated no ferrous sulfate; however, in the period between 240 seconds and 600 seconds, Example 14 experienced a temperature drop while maintaining higher temperatures than Example 15 which incorporated no ferrous sulfate and at the point in time of 600 seconds, Example 14 was at about 94° C. whereas Example 15 incorporating no ferrous sulfate was at about 88° C.

EXAMPLE 16

Figure 11:
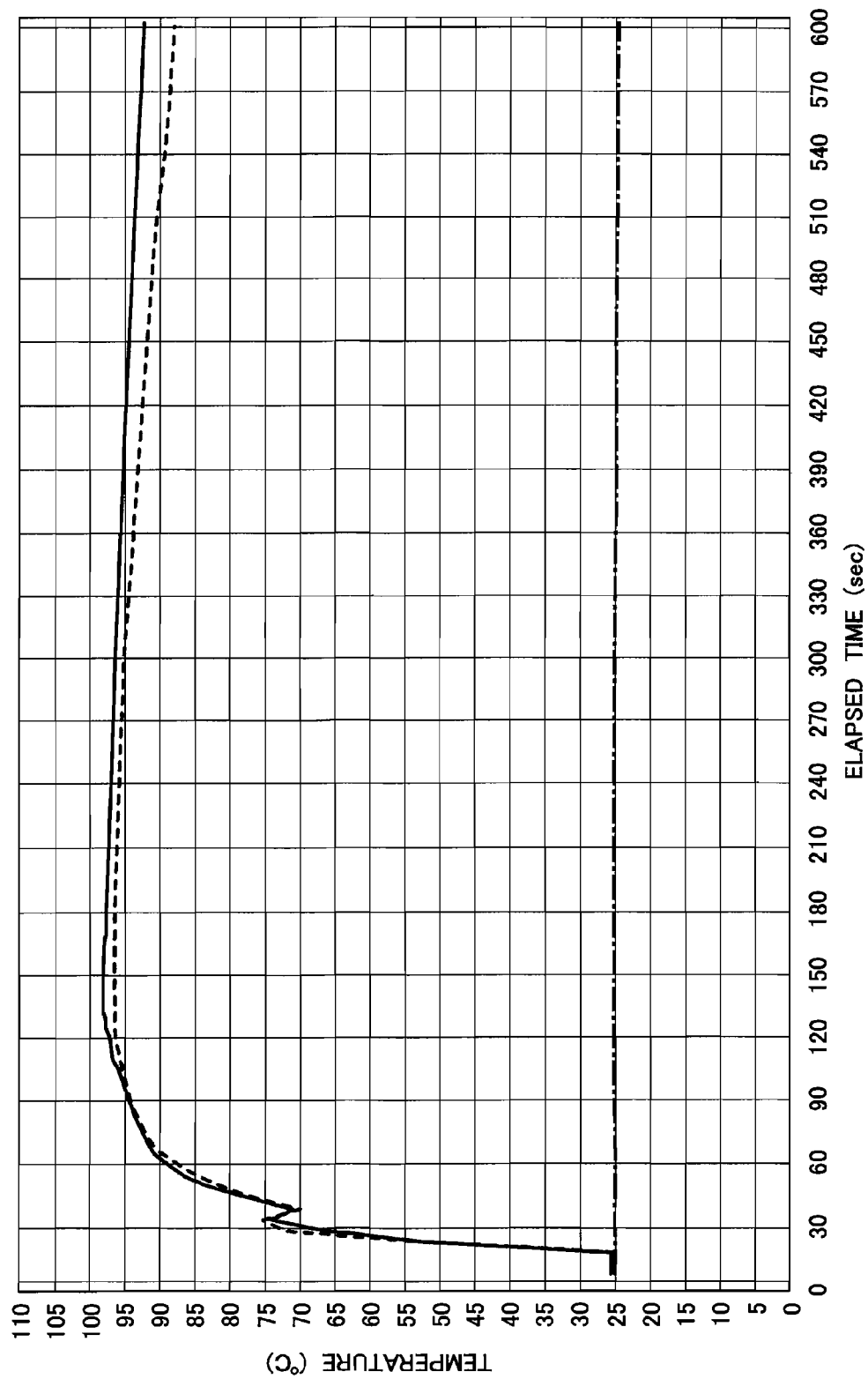
FIG. 11 is a graph showing Example 16 and Example 17.

To 10 g of the same exothermic agent as used in Example 3, a mixture of 0.5 g of sodium phosphate and 0.5 g of sodium sulfite was added in 1 g (accounting for 10% of the total mass of the exothermic agent) to give a total weight of 11 g and an experiment was conducted by the same procedure as in Example 6 except that 20 mL of water was added and that there was used the reaction vessel for the calorimeter for use with 10-20 g of the exothermic agent. The result obtained is shown in FIG. 11 by a solid line. The alternate long and short dash line in FIG. 11 extending between 25-30° C. refers to room temperature.

EXAMPLE 17

The procedure of Example 16 was repeated except that there was used 10 g of an exothermic agent consisting of 6 g of a 1:2 mixed aluminum powder consisting of 2 g of type 1 aluminum powder and 4 g of type 2 aluminum powder plus 4 g of calcium oxide. The result obtained is shown in FIG. 11 by a dotted line. The alternate long and short dash line in FIG. 11 extending between 25-30° C. refers to room temperature.

[Discussion 12]

As can be seen from the results shown in FIG. 11, up to about 270 seconds after the start of heat generation, no significant difference was observed between Example 16 which incorporated sodium phosphate and sodium sulfite and Example 17 which incorporated neither of them; however, in the period between 270 and 600 seconds, Example 16 experienced a temperature drop while maintaining higher temperatures than Example 17 which incorporated neither sodium phosphate nor sodium sulfite and at the point in time of 600 seconds, Example 16 was at about 93° C. whereas Example 17 incorporating neither sodium phosphate nor sodium sulfite was at about 88° C.

EXAMPLE 18

Figure 12:
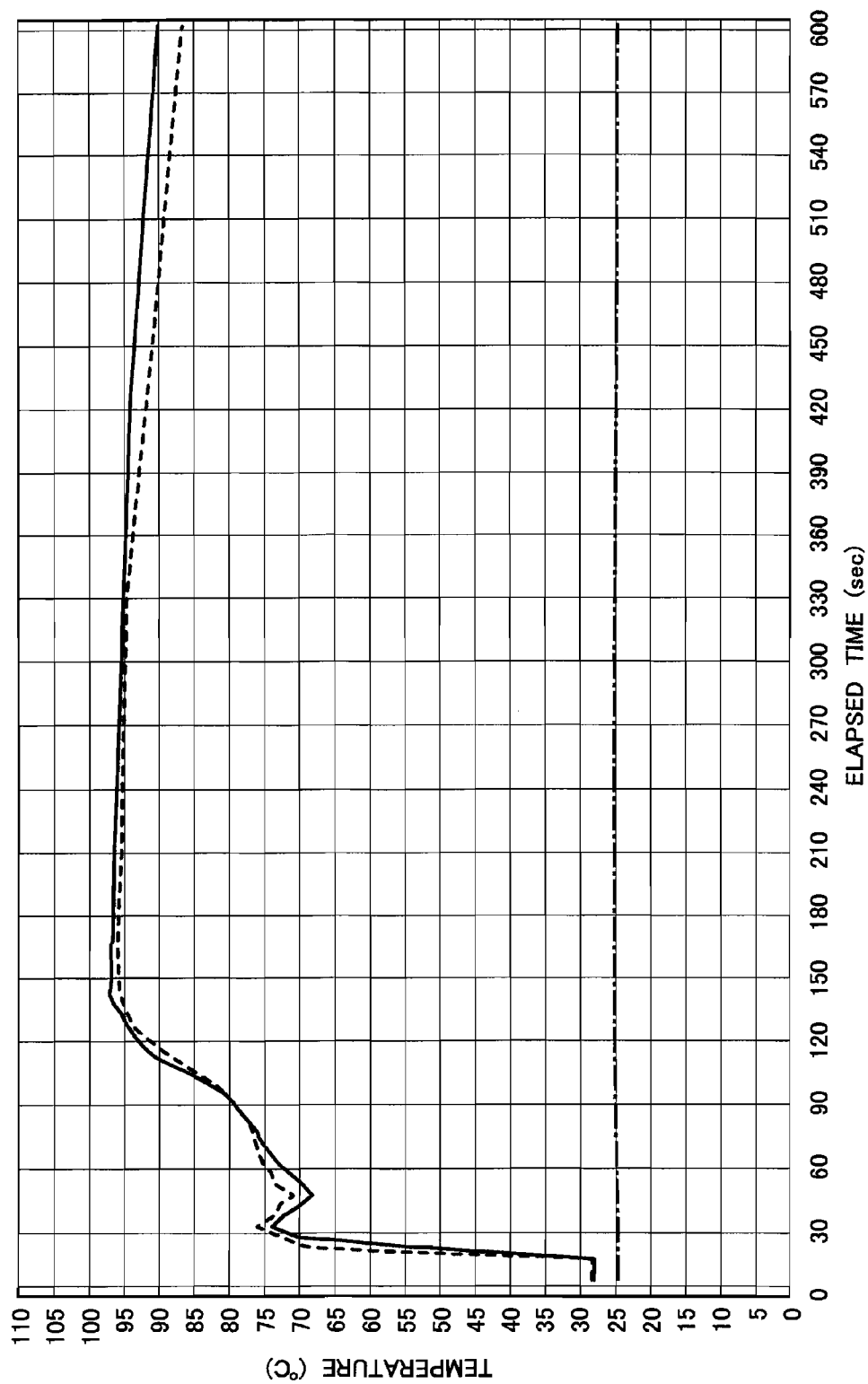
FIG. 12 is a graph showing Example 18 and Example 19.

To 20 g of an exothermic agent consisting of 13.9020 g of a mixed aluminum powder consisting of 4.6340 g of type 1 aluminum powder and 9.2680 g of type 2 aluminum powder (the mass of type 1 aluminum powder to the mass of type 2 aluminum powder=1:2, accounting for 69.5% of the mass of the exothermic agent) plus 6.10 g of calcium oxide (accounting for 30.5% of the mass of the exothermic agent), a mixture of 0.8 g of calcium sulfate and 0.8 g of magnesium chloride was added in 1.6 g (accounting for 8% of the total mass of the exothermic agent) to give a total weight of 21.6 g and an experiment was conducted by the same procedure as in Example 6 except that 40 mL of water was added and that there was used the reaction vessel for the calorimeter for use with more than 20 g of the exothermic agent. The result obtained is shown in FIG. 12 by a solid line. The alternate long and short dash line in FIG. 12 extending between 25-30° C. refers to room temperature.

EXAMPLE 19

The procedure of Example 18 was repeated except that there was used 20 g of an exothermic agent consisting of 12 g of a 1:2 mixed aluminum powder consisting of 4 g of type 1 aluminum powder and 8 g of type 2 aluminum powder plus 8 g of calcium oxide. The result obtained is shown in FIG. 12 by a dotted line. The alternate long and short dash line in FIG. 12 extending between 25-30° C. refers to room temperature.

[Discussion 13]

As can be seen from the results shown in FIG. 12, up to about 180 seconds after the start of heat generation, no significant difference was observed between Example 18 which incorporated both calcium sulfate and magnesium chloride and Example 19 which incorporated neither of them; however, in the period between 180 and 600 seconds, Example 18 experienced a temperature drop while maintaining higher temperatures than Example 19 which incorporated neither calcium sulfate nor magnesium chloride and at the point in time of 600 seconds, Example 18 was at about 90° C. whereas Example 19 incorporating neither calcium sulfate nor magnesium chloride was at about 86° C.

EXAMPLE 20

Figure 13:
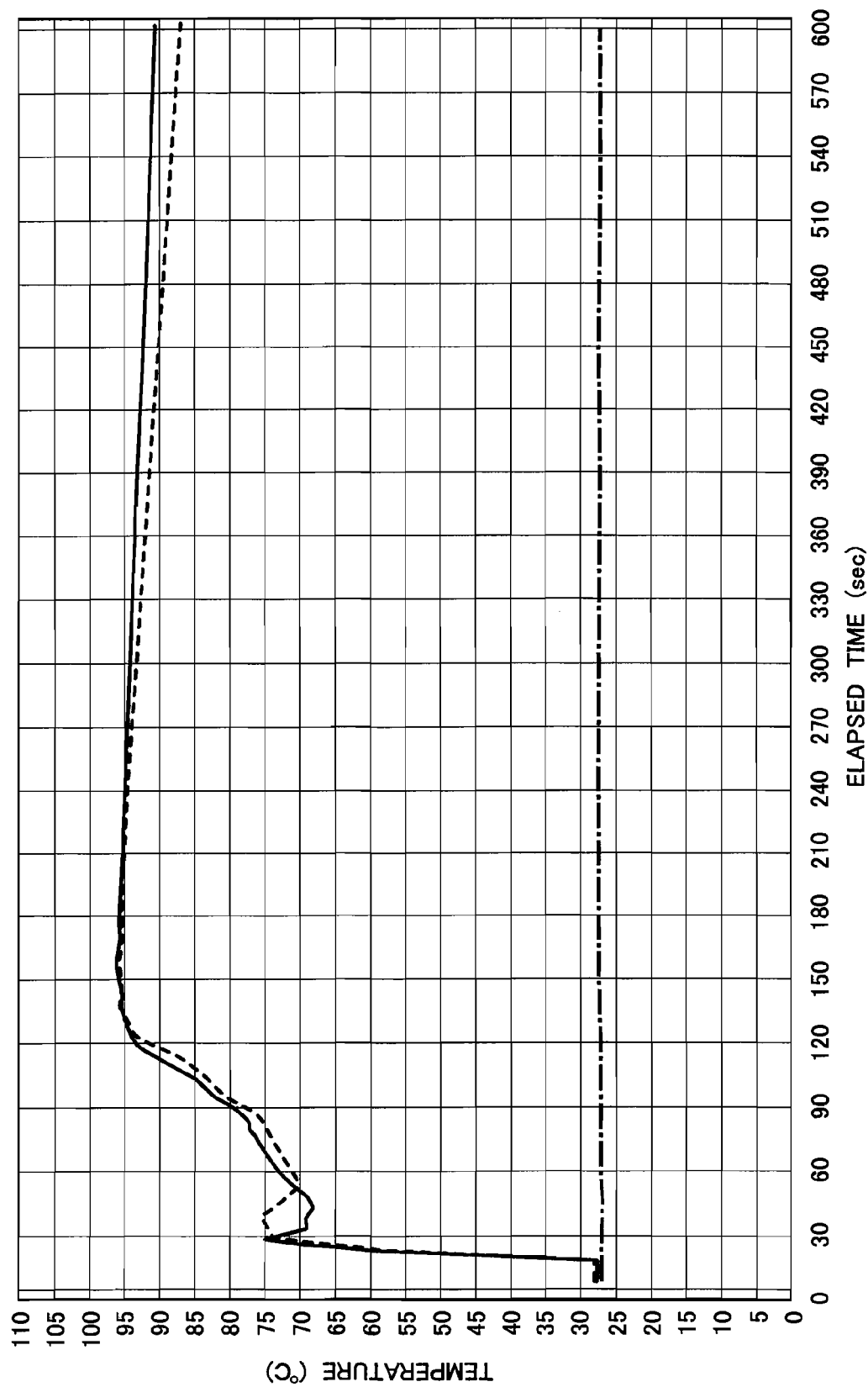
FIG. 13 is a graph showing Example 20 and Example 21.

To 20 g of an exothermic agent consisting of 12.10 g of a mixed aluminum powder consisting of 4.0340 g of type 1 aluminum powder and 8.0660 g of type 2 aluminum powder (the mass of type 1 aluminum powder to the mass of type 2 aluminum powder=1:2, accounting for 60.5% of the mass of the exothermic agent) plus 7.90 of calcium oxide (accounting for 39.5% of the mass of the exothermic agent), a mixture of 0.5 g of sodium sulfite and 0.5 g of sodium carbonate was added in 1.0 g (accounting for 5% of the total mass of the exothermic agent) to give a total weight of 21.0 g and an experiment was conducted by the same procedure as in Example 6 except that 40 mL of water was added and that there was used the reaction vessel for the calorimeter for use with more than 20 g of the exothermic agent. The result obtained is shown in FIG. 13 by a solid line. The alternate long and short dash line in FIG. 13 extending between 25-30° C. refers to room temperature.

EXAMPLE 21

The procedure of Example 20 was repeated except that there was used 20 g of an exothermic agent consisting of 12 g of a 1:2 mixed aluminum powder consisting of 4 g of type 1 aluminum powder and 8 g of type 2 aluminum powder plus 8 g of calcium oxide. The result is shown in FIG. 13 by a dotted line. The alternate long and short dash line in FIG. 13 extending between 25-30° C. refers to room temperature.

[Discussion 14]

As can be seen from the results shown in FIG. 13, up to about 210 seconds after the start of heat generation, no significant difference was observed between Example 20 which incorporated both sodium sulfite and sodium carbonate and Example 21 which incorporated neither of them; however, in the period between 210 and 600 seconds, Example 20 experienced a temperature drop while maintaining higher temperatures than Example 21 which incorporated neither sodium sulfite nor sodium carbonate and at the point in time of 600 seconds, Example 20 was at about 90° C. whereas Example 21 incorporating neither sodium sulfite nor sodium carbonate was at about 87° C.

COMPARATIVE EXAMPLES 6 TO 21

In the following Comparative Examples 6 to 21, the inorganic salts recited in claim 2 were added in amounts outside the range of 5 to 10% relative to the total mass of the exothermic agent recited in claim 1 and their exothermic effects were checked to verify that 5 to 10% as amounts to be added relative to the total mass of the exothermic agent recited in claim 1 are critical values.

COMPARATIVE EXAMPLE 6

Figure 14:
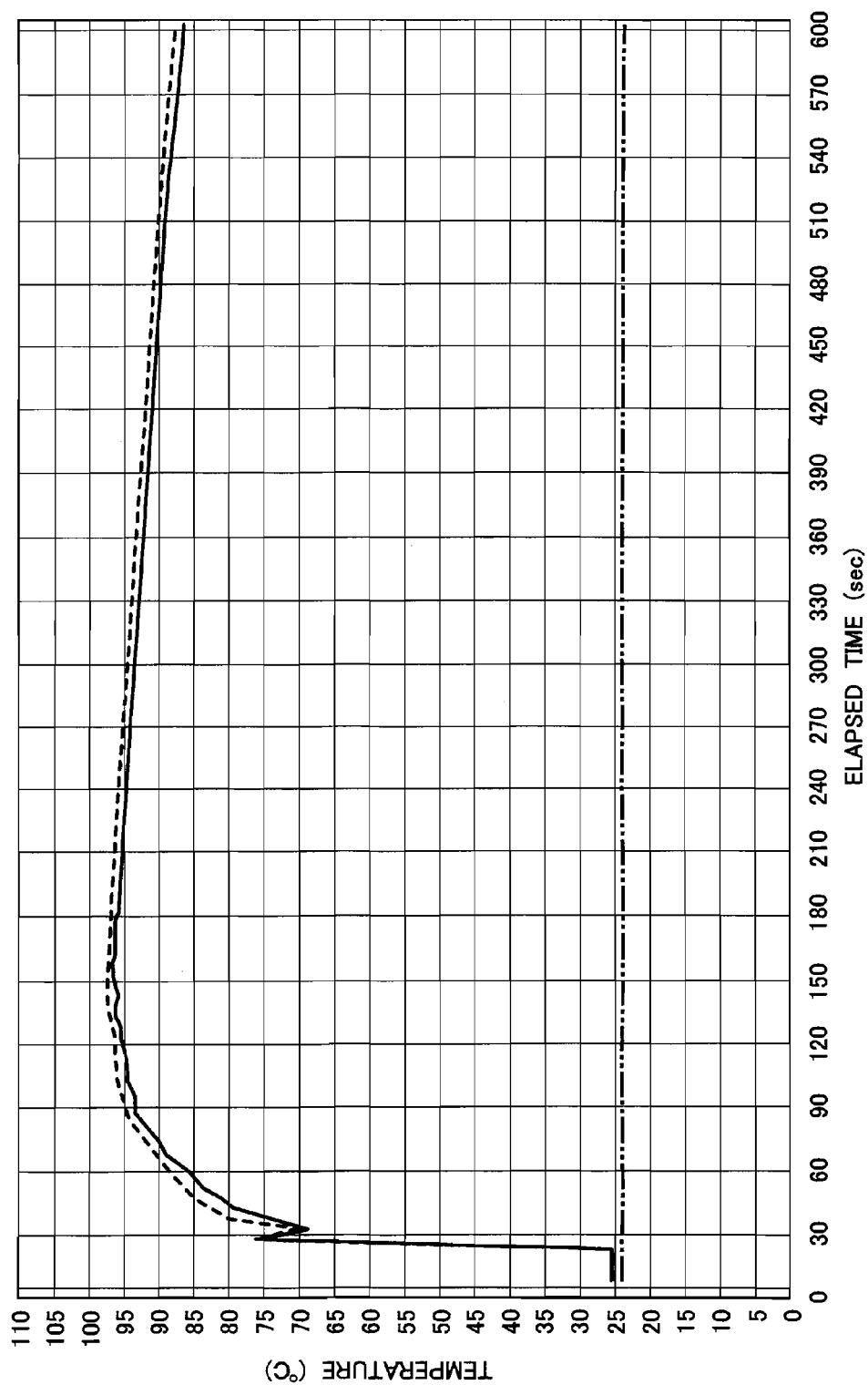
FIG. 14 is a graph showing Comparative Example 6.

To 10 g of an exothermic agent consisting of 6.05 g of a mixed aluminum powder consisting of 2.017 g of type 1 aluminum powder and 4.033 g of type 2 aluminum powder (the mass of type 1 aluminum powder to the mass of type 2 aluminum powder=1:2, accounting for 60.5% of the mass of the exothermic agent) plus 3.95 g of calcium oxide (accounting for 39.5% of the mass of the exothermic agent), ferrous sulfate was added in 0.3 g (accounting for 3% of the total mass of the exothermic agent); a control was prepared in the same manner as above except that ferrous sulfate was not added; using 20 mL of water, a heat generation experiment was conducted by the same procedure as in the above-described Example 3 and ensuing Examples; the results obtained are shown in FIG. 14 by a solid line (for the case where ferrous sulfate was added) and by a dotted line (for case where it was not added). Upon examining FIG. 14, it is clear that no significant difference in exothermic effect was observed between the case where ferrous sulfate was added in an amount of 0.3 g relative to the mass of the exothermic agent (accounting for 3% of the total mass of the exothermic agent) and the case where it was not added.

COMPARATIVE EXAMPLE 7

Figure 15:
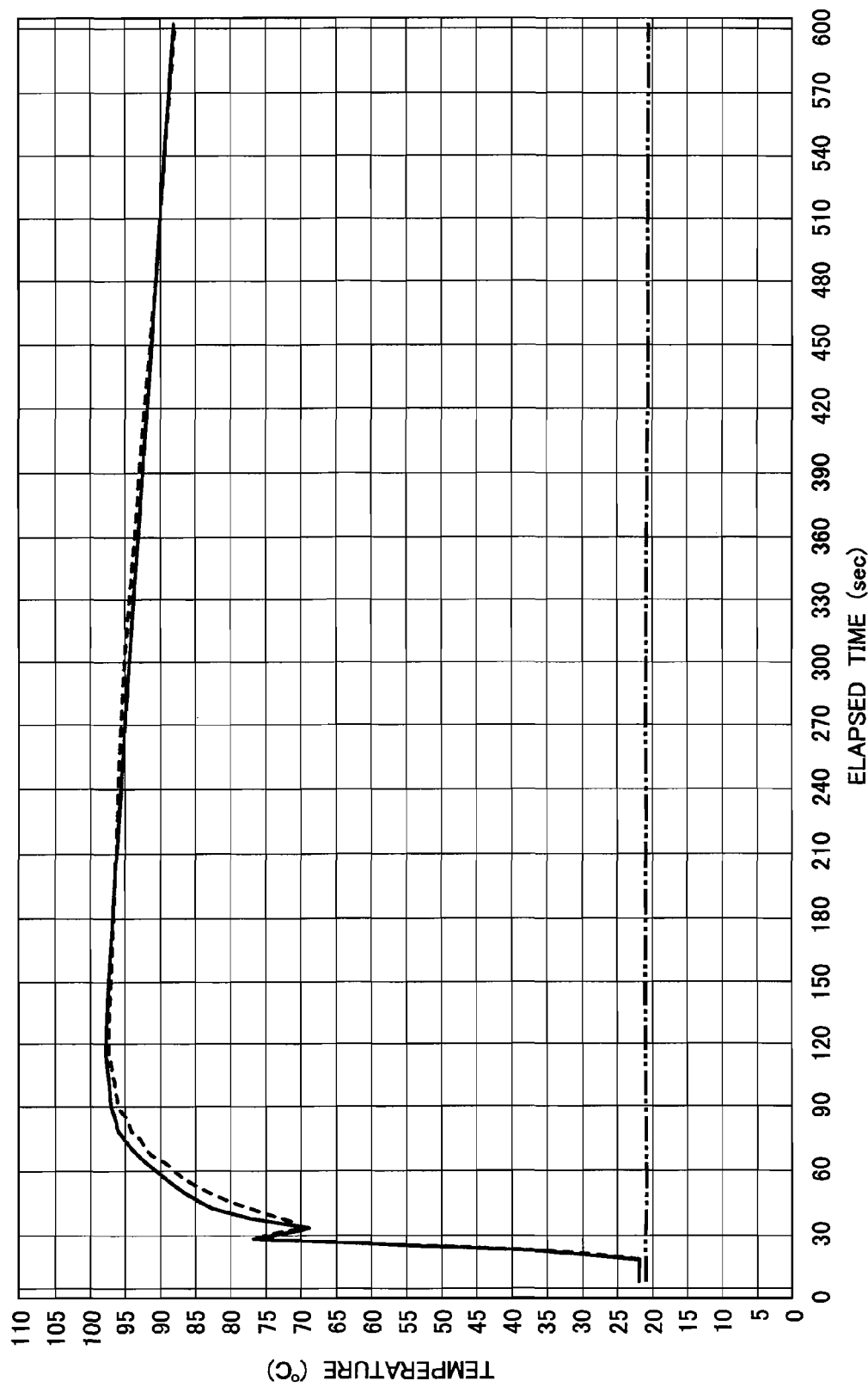
FIG. 15 is a graph showing Comparative Example 7.

The procedure of Comparative Example 6 was repeated, except that the ferrous sulfate was replaced by calcium carbonate which was added in 0.4 g (accounting for 4% of the total mass of the exothermic agent); the results obtained are shown in FIG. 15 by a solid line (for the case where calcium carbonate was added) and by a dotted line (for case where it was not added). Upon examining FIG. 15, it is clear that no significant difference in exothermic effect was observed between the case where calcium carbonate was added in an amount of 0.4 g relative to the mass of the exothermic agent (accounting for 4% of the total mass of the exothermic agent) and the case where it was not added.

COMPARATIVE EXAMPLE 8

Figure 16:
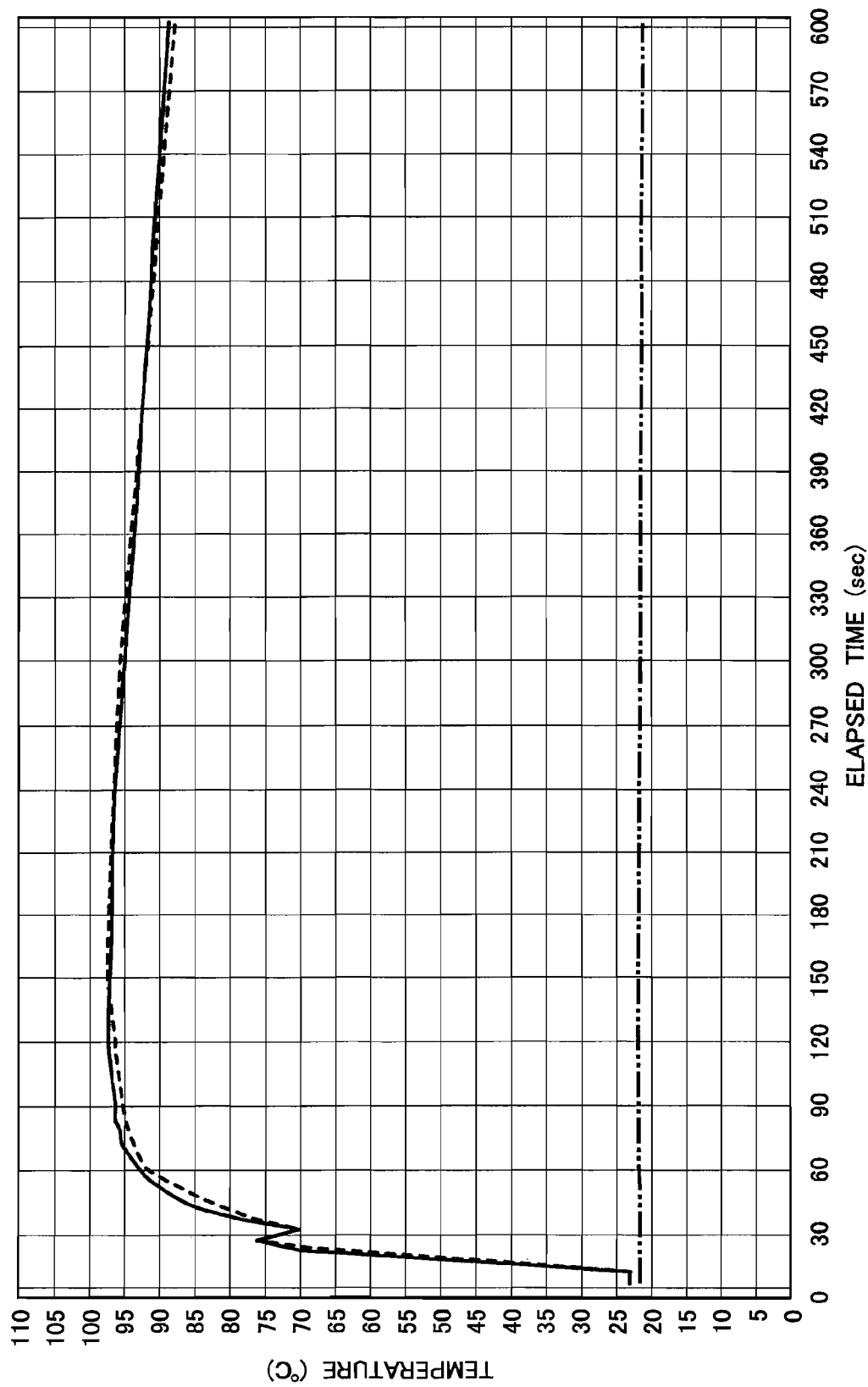
FIG. 16 is a graph showing Comparative Example 8.

The procedure of Comparative Example 6 was repeated, except that the ferrous sulfate was replaced by magnesium chloride which was added in 0.4 g (accounting for 4% of the total mass of the exothermic agent); the results obtained are shown in FIG. 16 by a solid line (for the case where magnesium chloride was added) and by a dotted line (for case where it was not added). Upon examining FIG. 16, it is clear that no significant difference in exothermic effect was observed between the case where magnesium chloride was added in an amount of 0.4 g relative to the mass of the exothermic agent (accounting for 4% of the total mass of the exothermic agent) and the case where it was not added.

COMPARATIVE EXAMPLE 9

Figure 17:
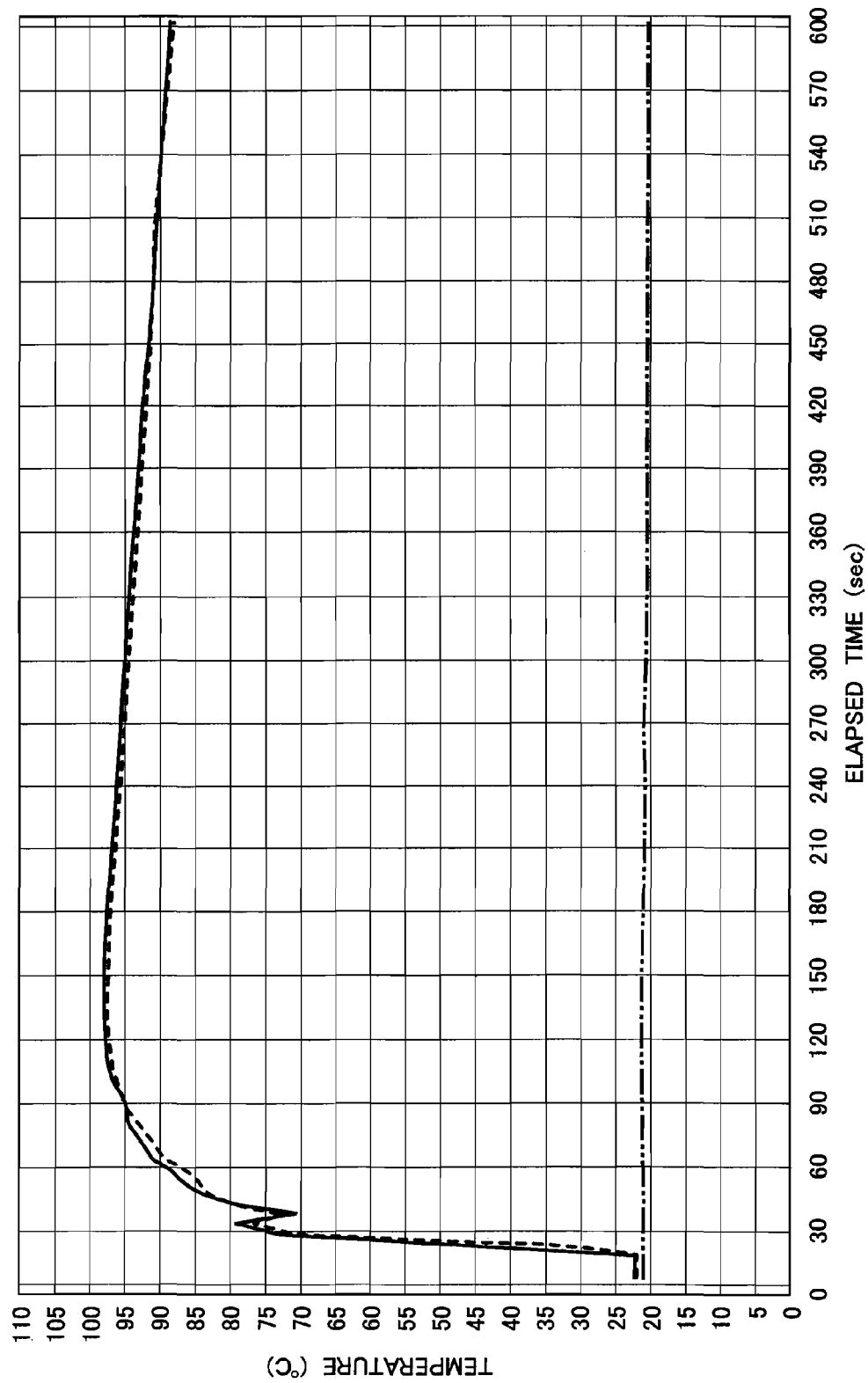
FIG. 17 is a graph showing Comparative Example 9.

The procedure of Comparative Example 6 was repeated, except that the ferrous sulfate was replaced by 0.2 g of calcium sulfate and 0.2 g of magnesium chloride which totaled 0.4 g (accounting for 4% of the total mass of the exothermic agent); the results obtained are shown in FIG. 17 by a solid line (for the case where calcium sulfate and magnesium chloride were added) and by a dotted line (for case where neither of them was added). Upon examining FIG. 17, it is clear that no significant difference in exothermic effect was observed between the case where 0.2 g of calcium sulfate and 0.2 g of magnesium chloride were added totaling 0.4 g (accounting for 4% of the total mass of the exothermic agent) and the case where neither of them was added.

COMPARATIVE EXAMPLE 10

Figure 18:
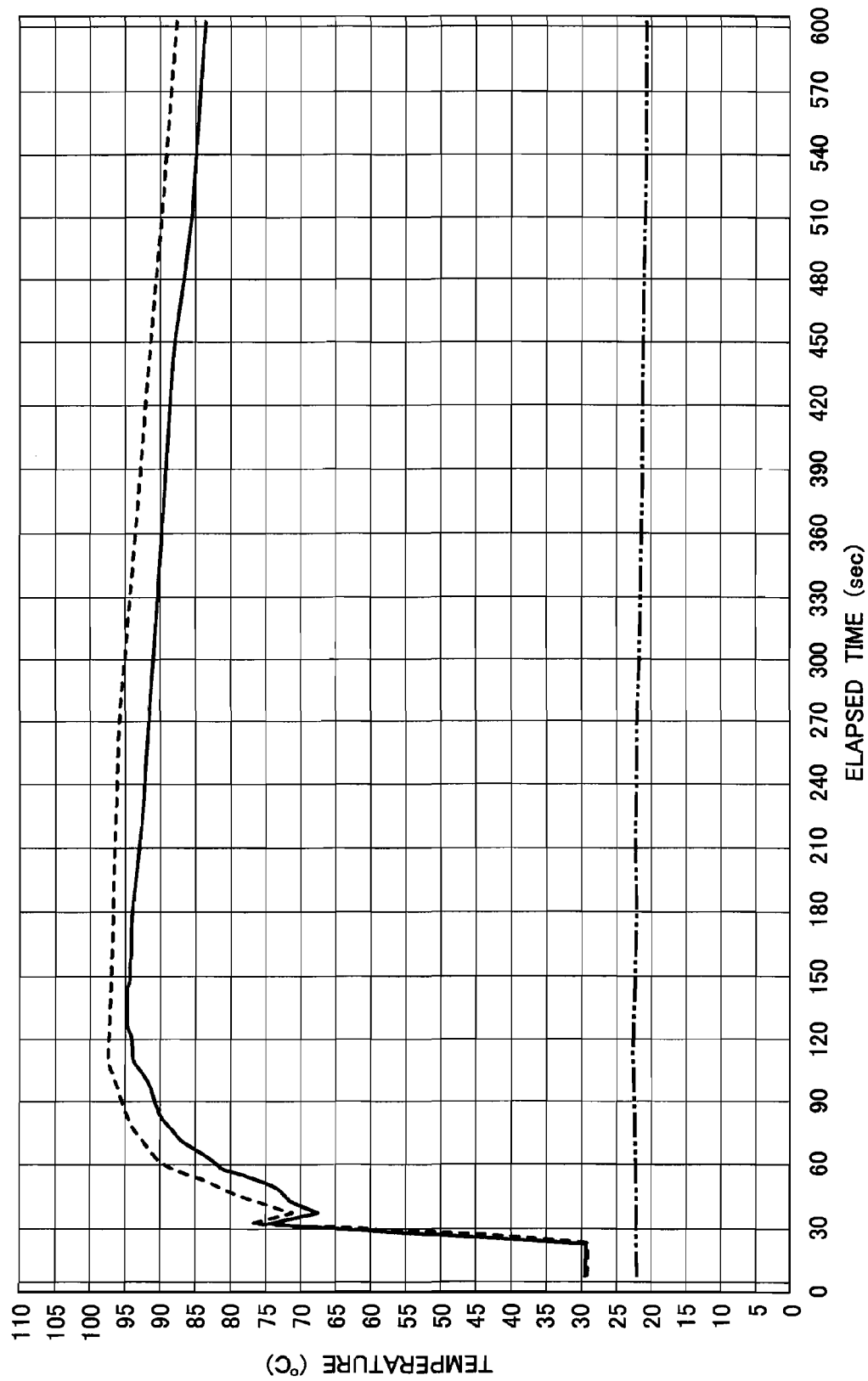
FIG. 18 is a graph showing Comparative Example 10.

The procedure of Comparative Example 6 was repeated, except that the ferrous sulfate was replaced by sodium carbonate which was added in 1.1 g (accounting for 11% of the total mass of the exothermic agent); the results obtained are shown in FIG. 18 by a solid line (for the case where sodium carbonate was added) and by a dotted line (for the case where it was not added). Upon examining FIG. 18, it is clear that the addition of sodium carbonate in an amount of 1.1 g (accounting for 11% of the total mass of the exothermic agent) caused a general drop in the temperature of heat generation compared to the case where it was not added.

COMPARATIVE EXAMPLE 11

Figure 19:
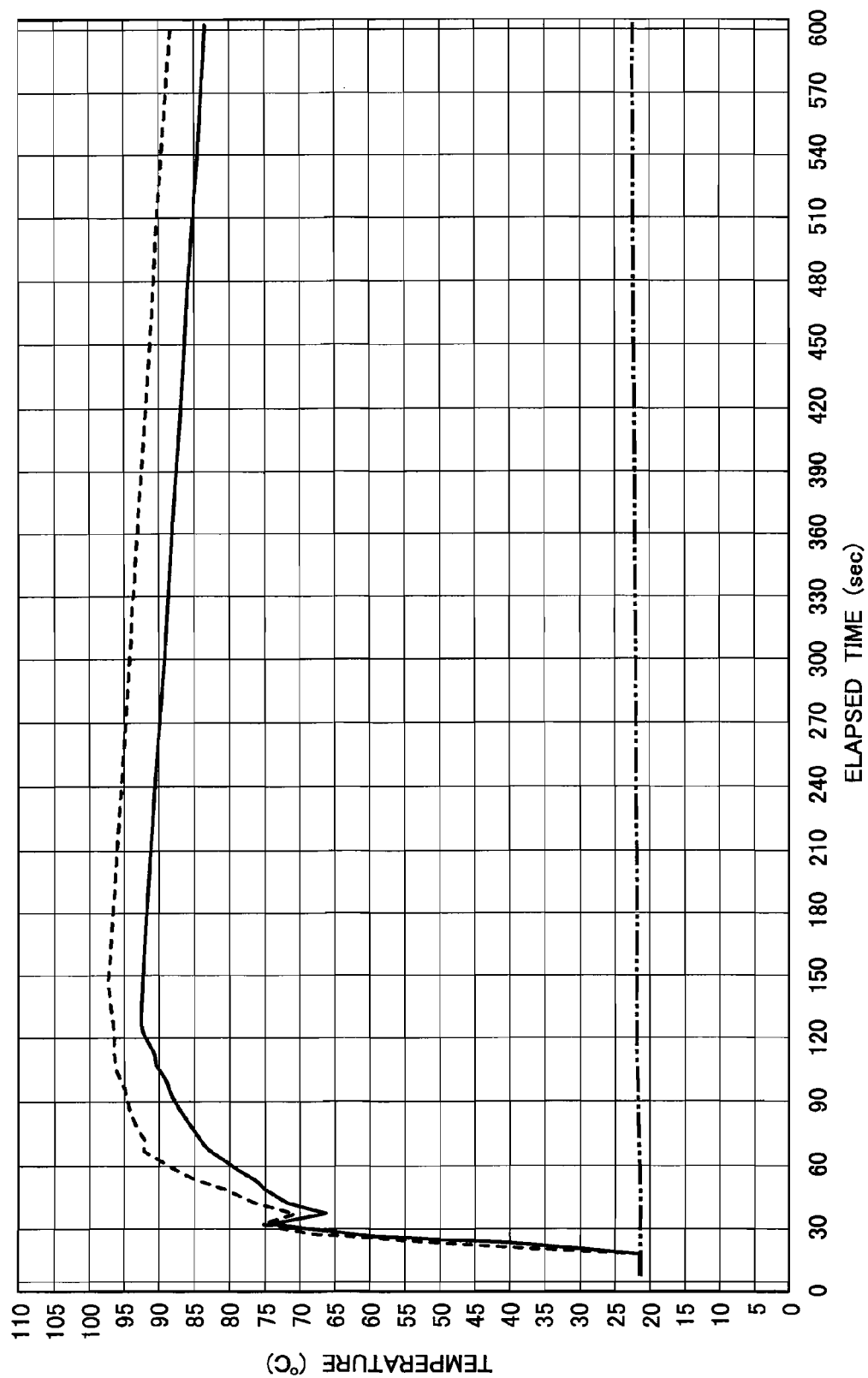
FIG. 19 is a graph showing Comparative Example 11.

The procedure of Comparative Example 6 was repeated, except that the ferrous sulfate was replaced by 0.6 g of sodium sulfite and 0.6 g of sodium carbonate which totaled 1.2 g (accounting for 12% of the total mass of the exothermic agent); the results obtained are shown in FIG. 19 by a solid line (for the case where sodium sulfite and sodium carbonate were added) and by a dotted line (for case where neither of them was added). Upon examining FIG. 19, it is clear that the addition of 0.6 g of sodium sulfite and 0.6 g of sodium carbonate totaling 1.2 g (accounting for 12% of the total mass of the exothermic agent) caused a general drop in the temperature of heat generation compared to the case where neither of them was added.

COMPARATIVE EXAMPLE 12

Figure 20:
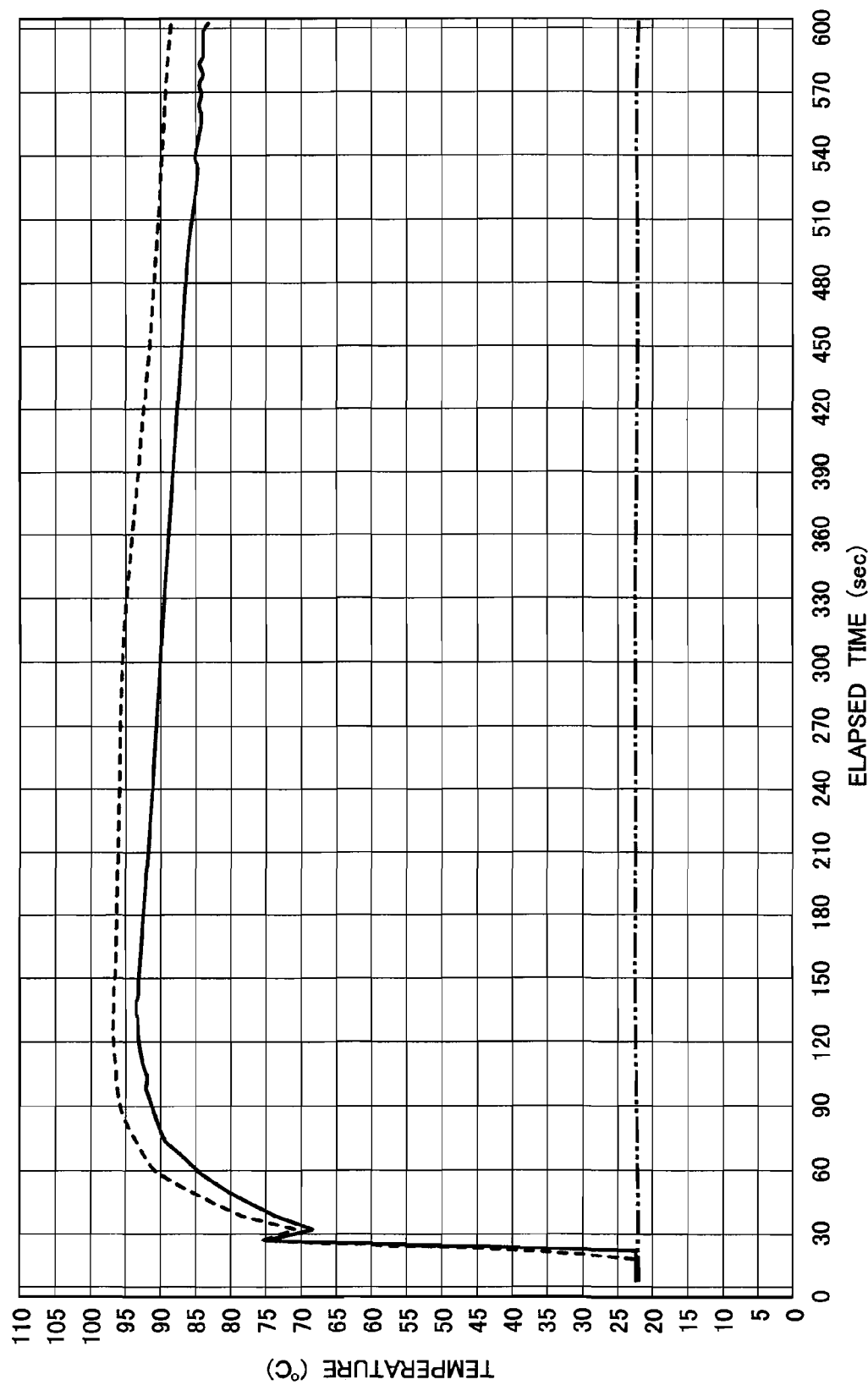
FIG. 20 is a graph showing Comparative Example 12.

The procedure of Comparative Example 6 was repeated, except that the ferrous sulfate was replaced by 0.6 g of sodium phosphate and 0.6 g of sodium sulfite which totaled 1.2 g (accounting for 12% of the total mass of the exothermic agent); the results obtained are shown in FIG. 20 by a solid line (for the case where sodium phosphate and sodium sulfite were added) and by a dotted line (for case where neither of them was added). Upon examining FIG. 20, it is clear that the addition of 0.6 g of sodium phosphate and 0.6 g of sodium sulfite totaling 1.2 g (accounting for 12% of the total mass of the exothermic agent) caused a general drop in the temperature of heat generation compared to the case where neither of them was added.

COMPARATIVE EXAMPLE 13

Figure 21:
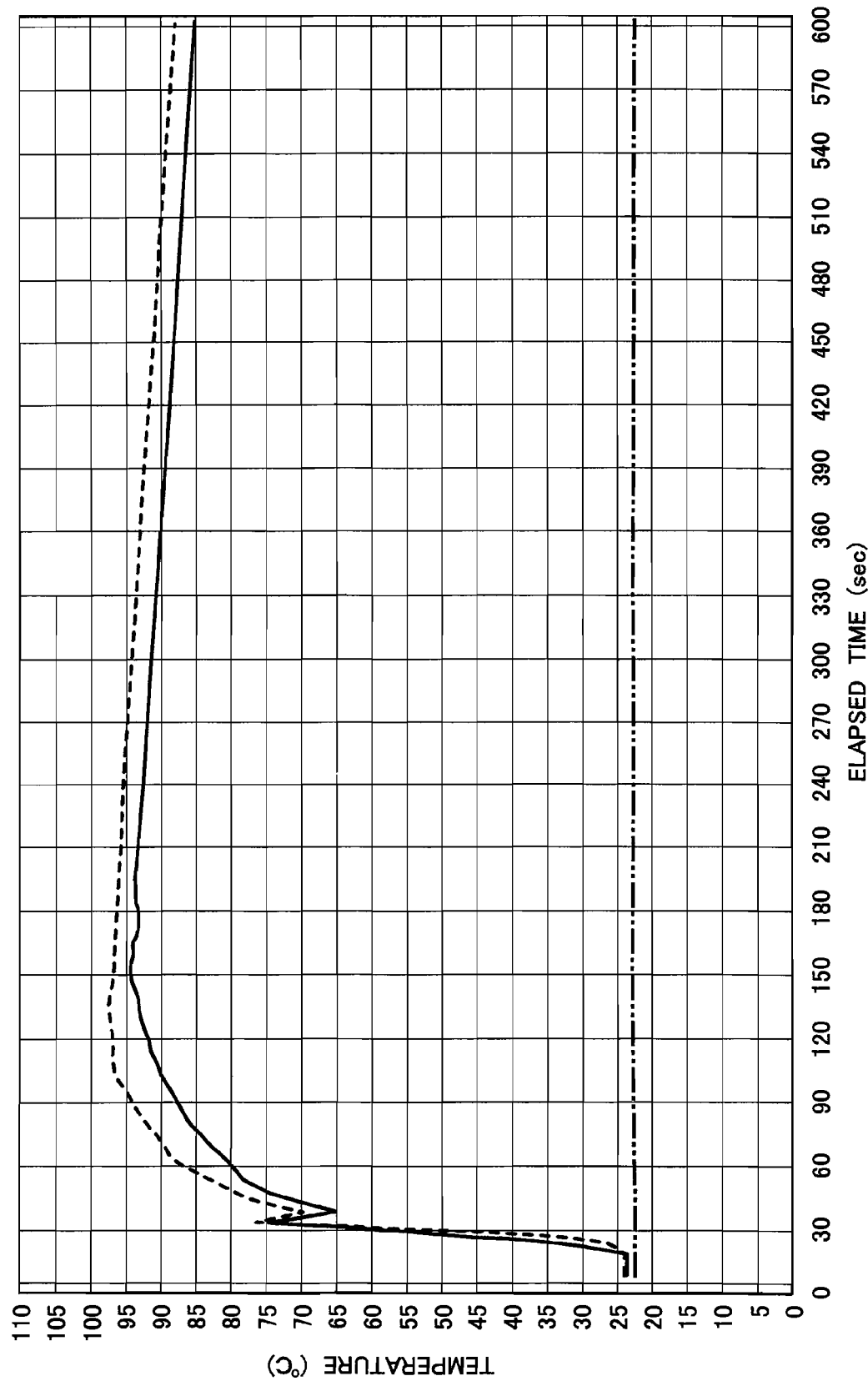
FIG. 21 is a graph showing Comparative Example 13.

The procedure of Comparative Example 6 was repeated, except that the ferrous sulfate was replaced by sodium sulfite which was added in 1.2 g (accounting for 12% of the total mass of the exothermic agent); the results obtained are shown in FIG. 21 by a solid line (for the case where sodium sulfite was added) and by a dotted line (for the case where it was not added). Upon examining FIG. 21, it is clear that the addition of sodium sulfite in an amount of 1.2 g (accounting for 12% of the total mass of the exothermic agent) caused a general drop in the temperature of heat generation compared to the case where it was not added.

COMPARATIVE EXAMPLE 14

Figure 22:
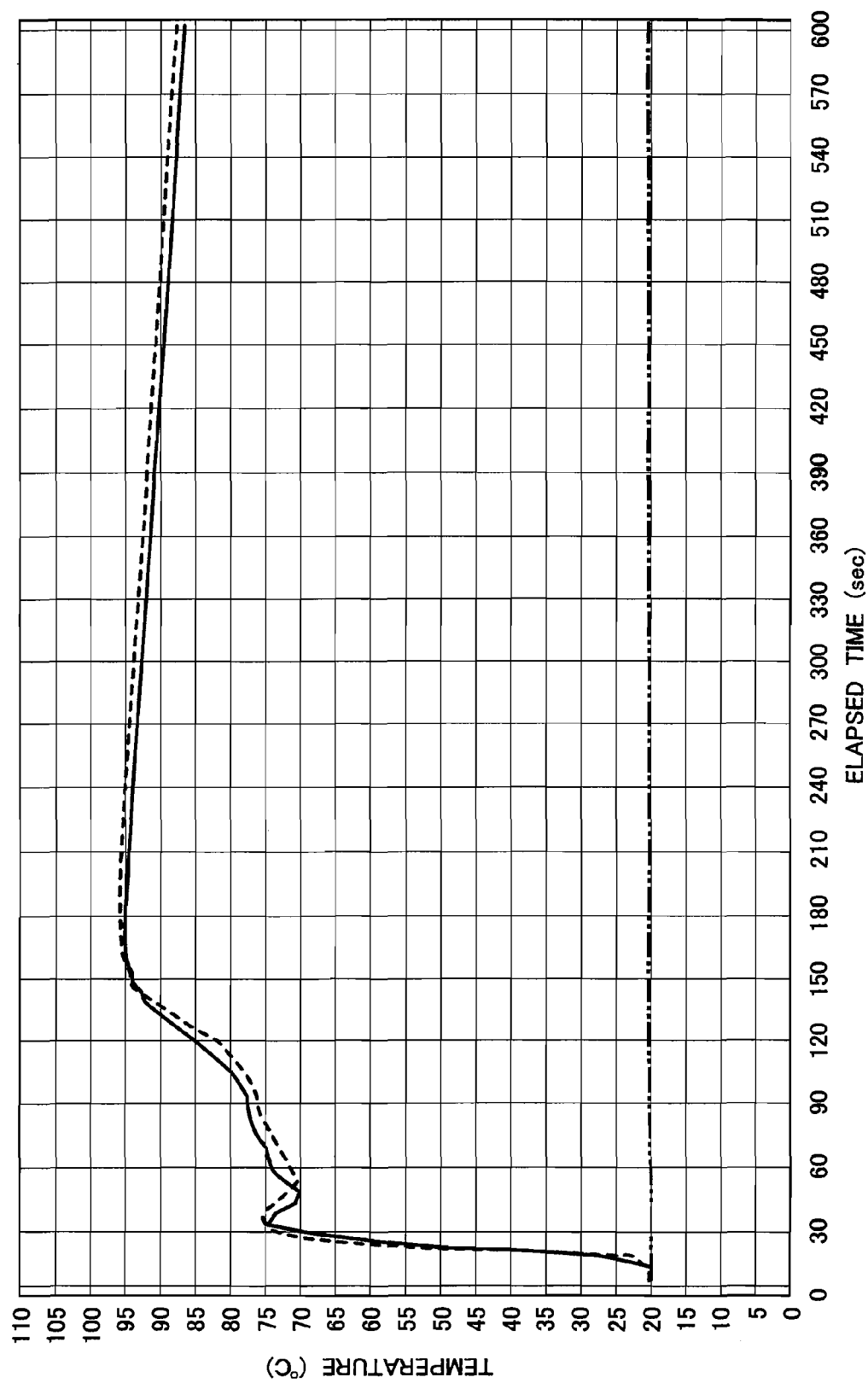
FIG. 22 is a graph showing Comparative Example 14.

To 20 g of an exothermic agent consisting of 13.9 g of a mixed aluminum powder consisting of 1.158 g of type 1 aluminum powder and 2.316 g of type 2 aluminum powder (the mass of type 1 aluminum powder to the mass of type 2 aluminum powder=1:2, accounting for 69.5% of the mass of the exothermic agent) plus 6.1 g of calcium oxide (accounting for 30.5% of the mass of the exothermic agent), ferrous sulfate was added in 0.6 g (accounting for 3% of the total mass of the exothermic agent); a control was prepared in the same manner as above except that ferrous sulfate was not added; using 40 mL of water, a heat generation experiment was conducted by the same procedure as in the above-described Example 3 and ensuing Examples; the results obtained are shown in FIG. 22 by a solid line (for the case where ferrous sulfate was added) and by a dotted line (for case where it was not added). Upon examining FIG. 22, it is clear that no significant difference in exothermic effect was observed between the case where ferrous sulfate was added in an amount of 0.6 g relative to the mass of the exothermic agent (accounting for 3% of the total mass of the exothermic agent) and the case where it was not added.

COMPARATIVE EXAMPLE 15

Figure 23:
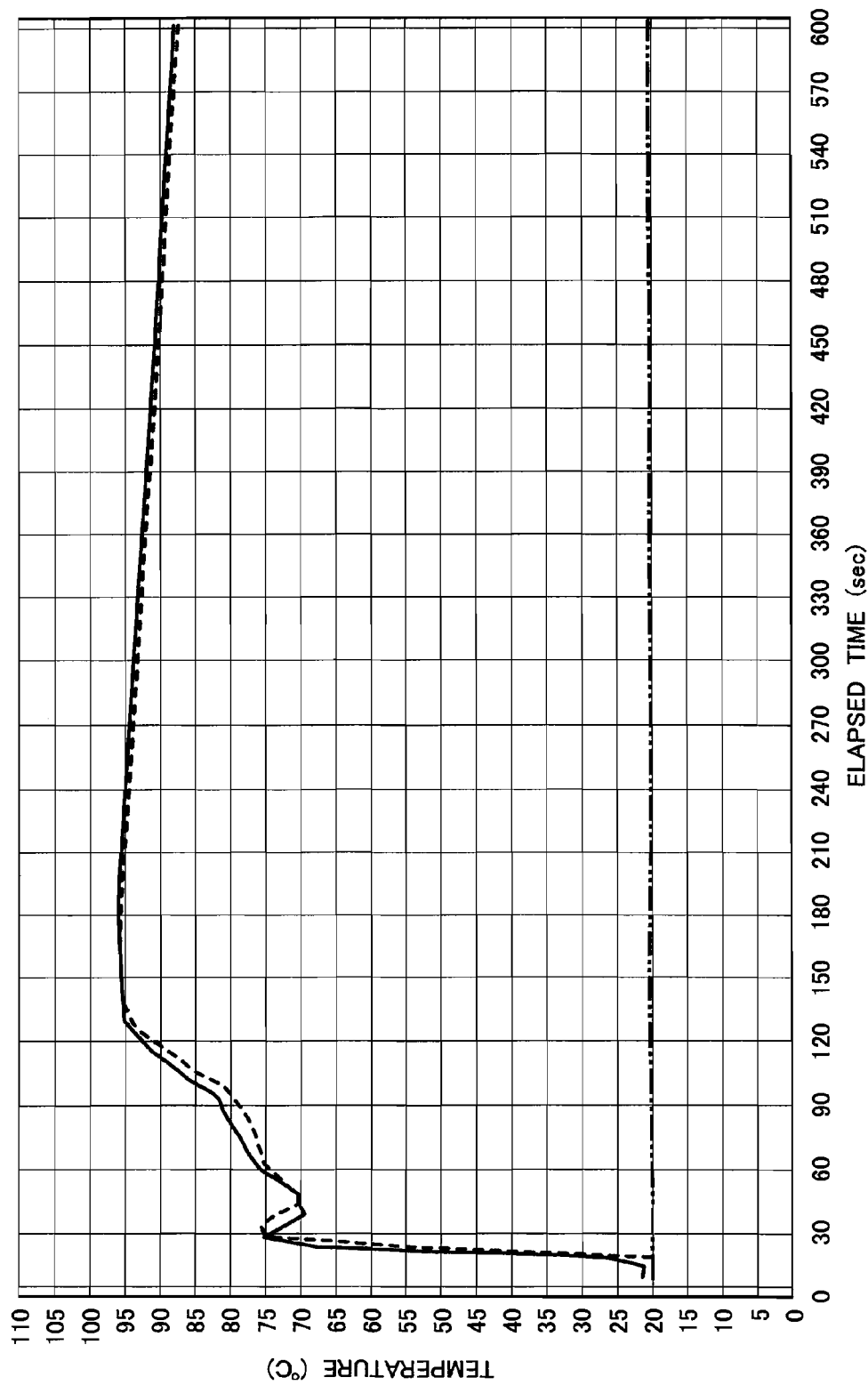
FIG. 23 is a graph showing Comparative Example 15.

The procedure of Comparative Example 14 was repeated, except that the ferrous sulfate was replaced by magnesium chloride which was added in 0.8 g (accounting for 4% of the total mass of the exothermic agent); the results obtained are shown in FIG. 23 by a solid line (for the case where magnesium chloride was added) and by a dotted line (for case where it was not added). Upon examining FIG. 23, it is clear that no significant difference in exothermic effect was observed between the case where magnesium chloride was added in an amount of 0.8 g relative to the mass of the exothermic agent (accounting for 4% of the total mass of the exothermic agent) and the case where it was not added.

COMPARATIVE EXAMPLE 16

Figure 24:
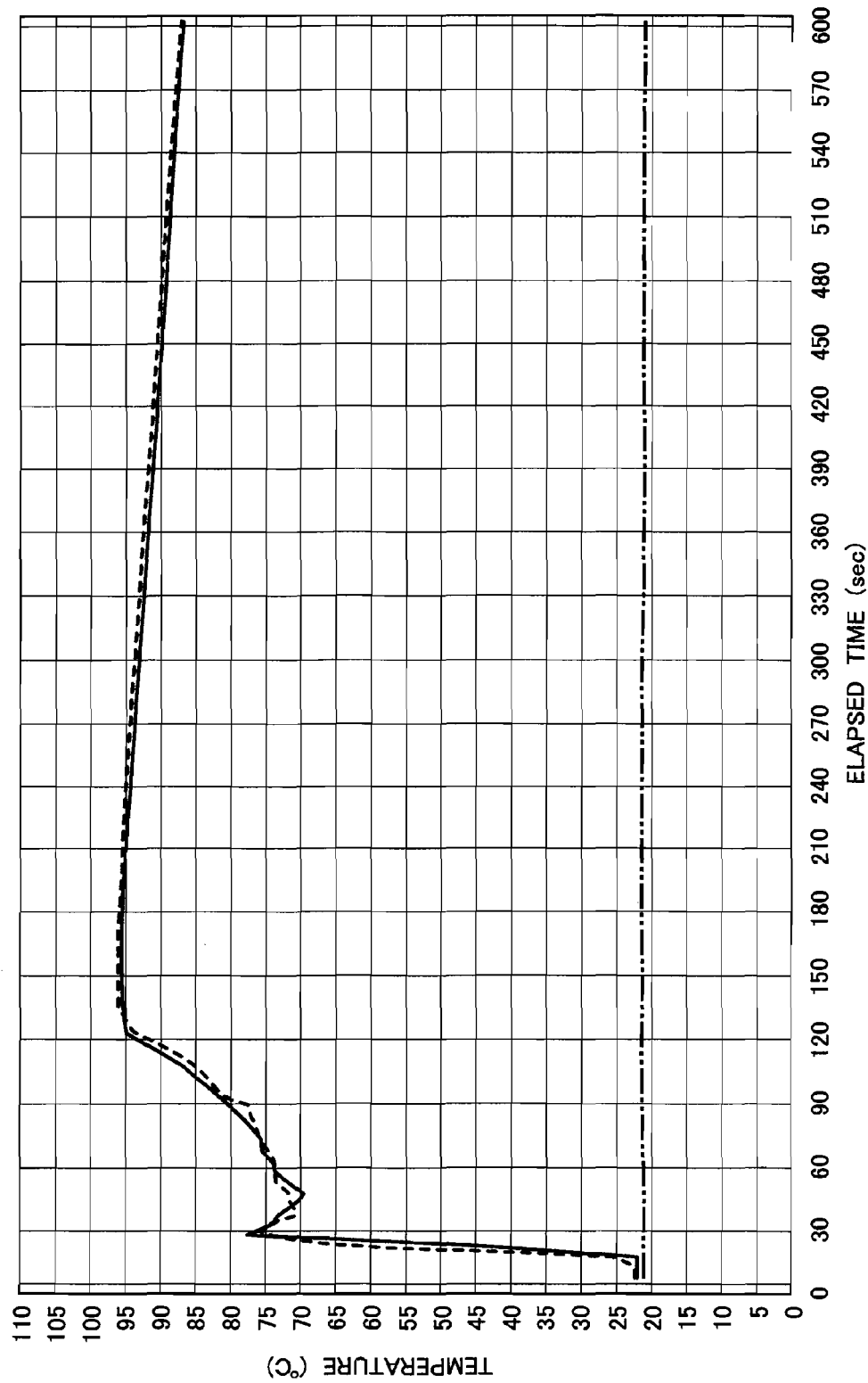
FIG. 24 is a graph showing Comparative Example 16.

The procedure of Comparative Example 14 was repeated, except that the ferrous sulfate was replaced by calcium carbonate which was added in 0.8 g (accounting for 4% of the total mass of the exothermic agent); the results obtained are shown in FIG. 24 by a solid line (for the case where calcium carbonate was added) and by a dotted line (for case where it was not added). Upon examining FIG. 24, it is clear that no significant difference in exothermic effect was observed between the case where calcium carbonate was added in an amount of 0.8 g relative to the mass of the exothermic agent (accounting for 4% of the total mass of the exothermic agent) and the case where it was not added.

COMPARATIVE EXAMPLE 17

Figure 25:
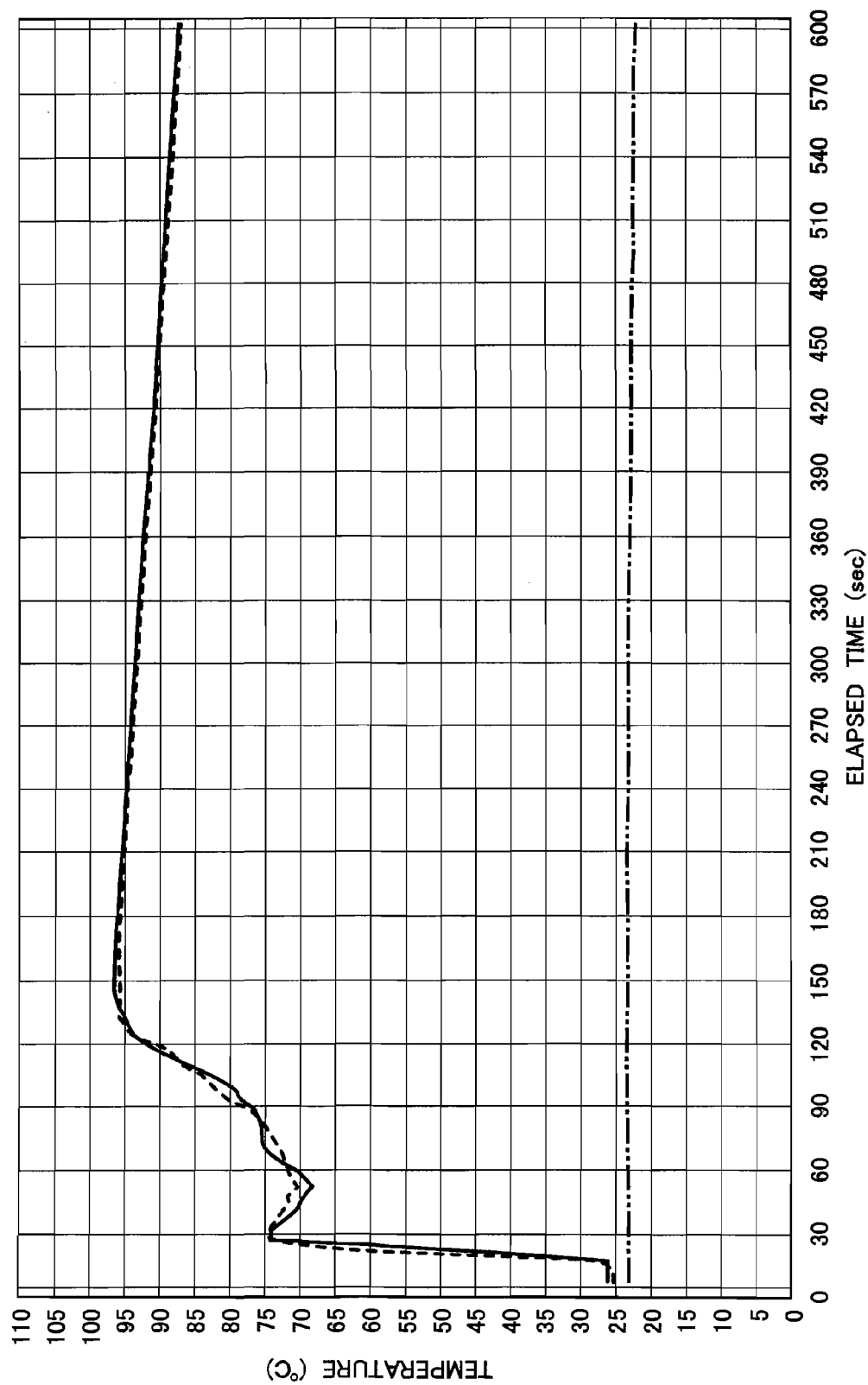
FIG. 25 is a graph showing Comparative Example 17.

The procedure of Comparative Example 14 was repeated, except that the ferrous sulfate was replaced by 0.4 g of calcium sulfate and 0.4 g of magnesium chloride which totaled 0.8 g (accounting for 4% of the total mass of the exothermic agent); the results obtained are shown in FIG. 25 by a solid line (for the case where calcium sulfate and magnesium chloride were added) and by a dotted line (for case where neither of them was added). Upon examining FIG. 25, it is clear that no significant difference in exothermic effect was observed between the case where 0.4 g of calcium sulfate and 0.4 g of magnesium chloride were added totaling 0.8 g (accounting for 4% of the total mass of the exothermic agent) and the case where neither of them was added.

COMPARATIVE EXAMPLE 18

Figure 26:
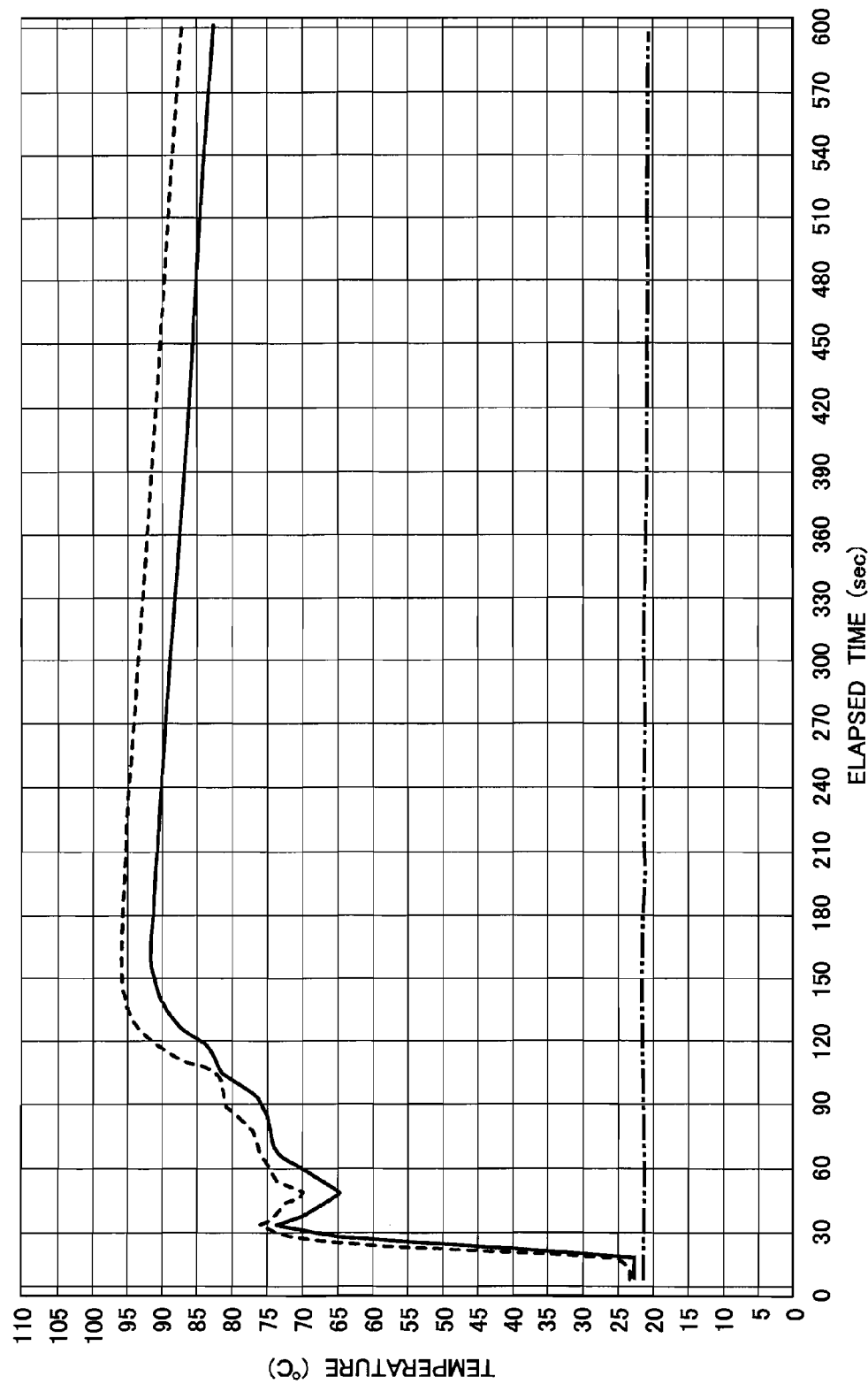
FIG. 26 is a graph showing Comparative Example 18.

The procedure of Comparative Example 14 was repeated, except that the ferrous sulfate was replaced by sodium carbonate which was added in 2.2 g (accounting for 11% of the total mass of the exothermic agent); the results obtained are shown in FIG. 26 by a solid line (for the case where sodium carbonate was added) and by a dotted line (for the case where it was not added). Upon examining FIG. 26, it is clear that the addition of sodium carbonate in an amount of 2.2 g (accounting for 11% of the total mass of the exothermic agent) caused a general drop in the temperature of heat generation compared to the case where it was not added.

COMPARATIVE EXAMPLE 19

Figure 27:
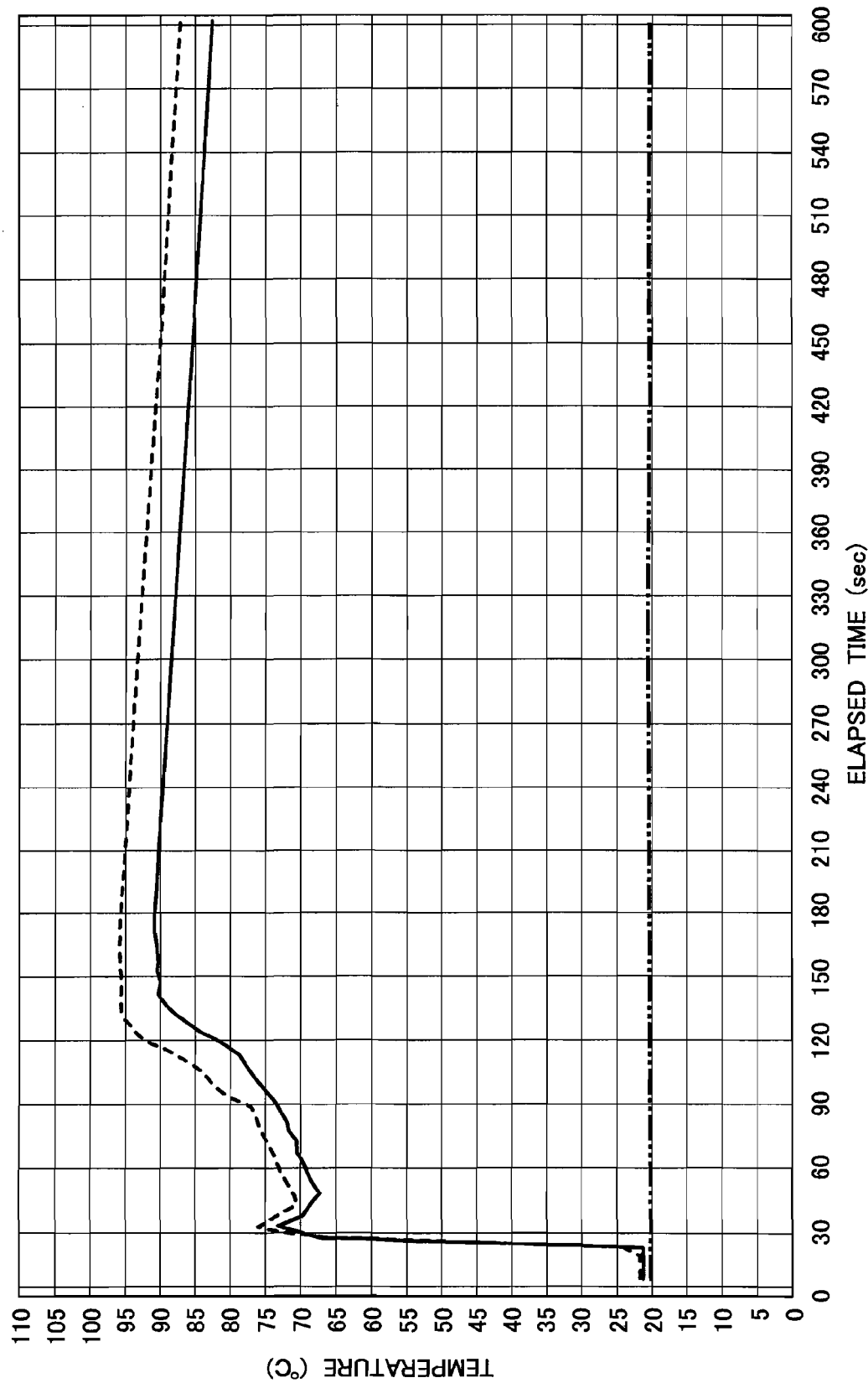
FIG. 27 is a graph showing Comparative Example 19.

The procedure of Comparative Example 14 was repeated, except that the ferrous sulfate was replaced by sodium sulfite which was added in 2.4 g (accounting for 12% of the total mass of the exothermic agent); the results obtained are shown in FIG. 27 by a solid line (for the case where sodium sulfite was added) and by a dotted line (for the case where it was not added). Upon examining FIG. 27, it is clear that the addition of sodium sulfite in an amount of 2.4 g (accounting for 12% of the total mass of the exothermic agent) caused a general drop in the temperature of heat generation compared to the case where it was not added.

COMPARATIVE EXAMPLE 20

Figure 28:
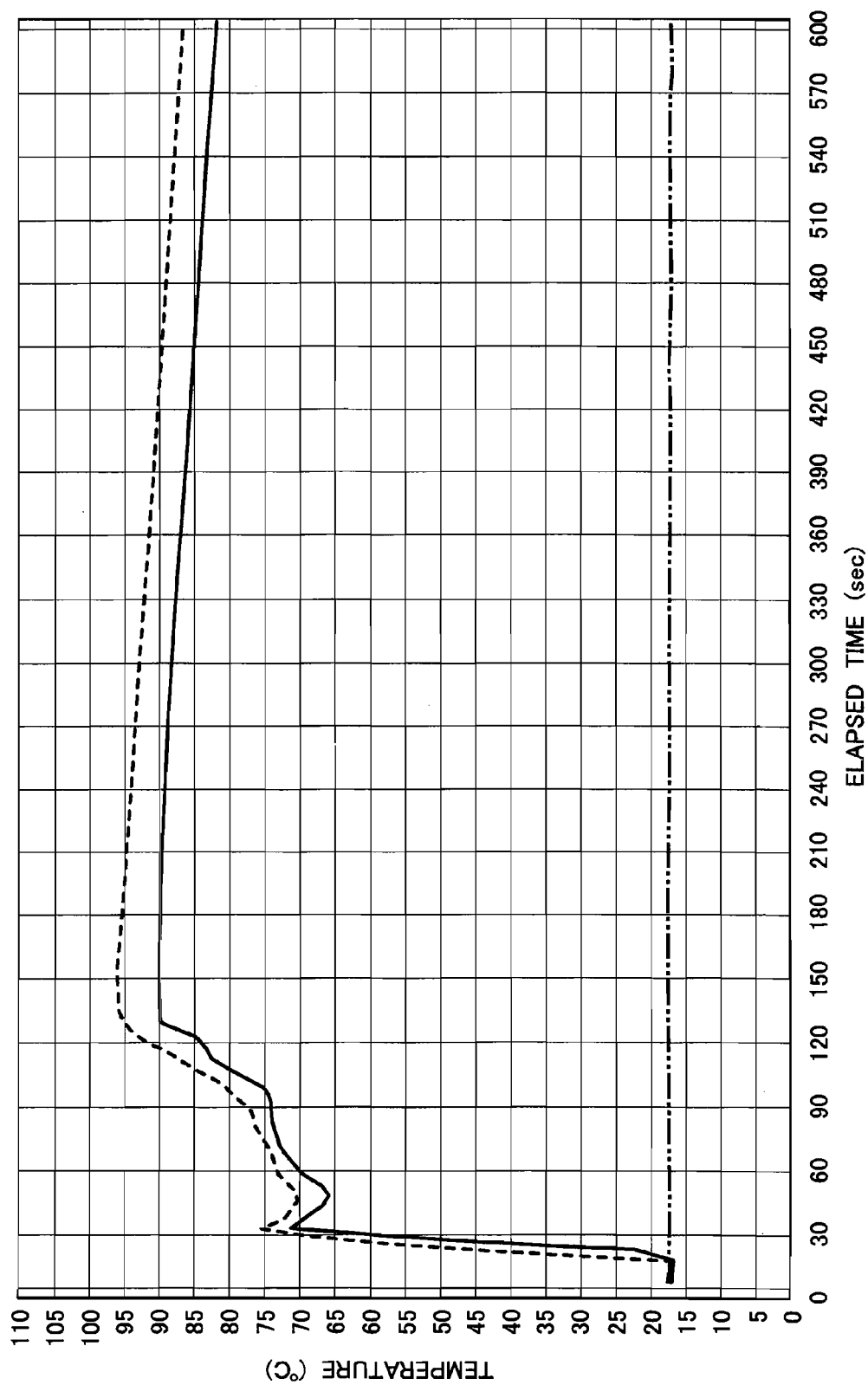
FIG. 28 is a graph showing Comparative Example 20.

The procedure of Comparative Example 14 was repeated, except that the ferrous sulfate was replaced by 1.2 g of sodium sulfite and 1.2 g of sodium carbonate which totaled 2.4 g (accounting for 12% of the total mass of the exothermic agent); the results obtained are shown in FIG. 28 by a solid line (for the case where sodium sulfite and sodium carbonate were added) and by a dotted line (for case where neither of them was added). Upon examining FIG. 28, it is clear that the addition of 1.2 g of sodium sulfite and 1.2 g of sodium carbonate totaling 2.4 g (accounting for 12% of the total mass of the exothermic agent) caused a general drop in the temperature of heat generation compared to the case where neither of them was added.

COMPARATIVE EXAMPLE 21

Figure 29:
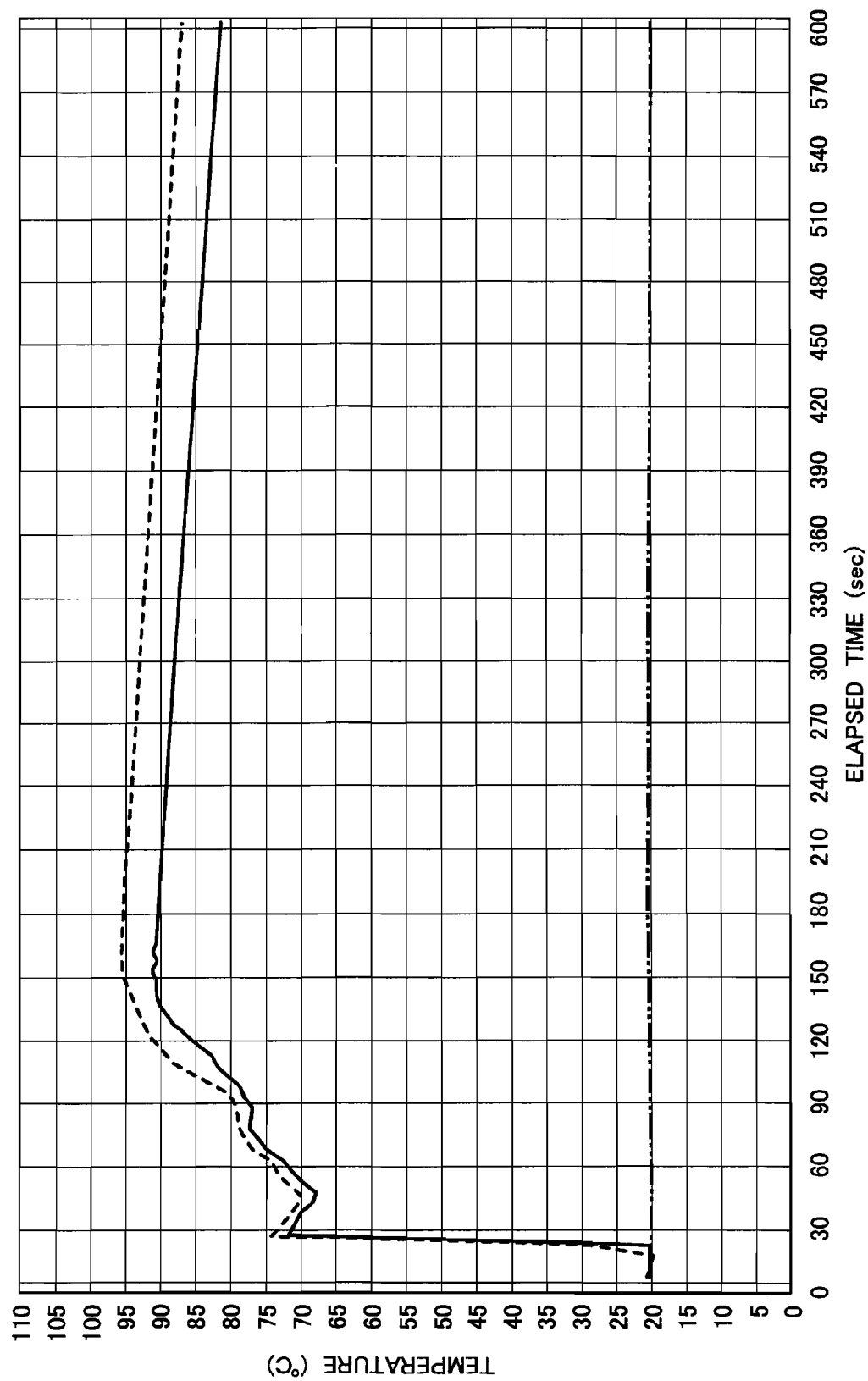
FIG. 29 is a graph showing Comparative Example 21.

The procedure of Comparative Example 14 was repeated, except that the ferrous sulfate was replaced by 1.2 g of sodium phosphate and 1.2 g of sodium sulfite which totaled 2.4 g (accounting for 12% of the total mass of the exothermic agent); the results obtained are shown in FIG. 29 by a solid line (for the case where sodium phosphate and sodium sulfite were added) and by a dotted line (for case where neither of them was added). Upon examining FIG. 29, it is clear that the addition of 1.2 g of sodium phosphate and 1.2 g of sodium sulfite totaling 2.4 g (accounting for 12% of the total mass of the exothermic agent) caused a general drop in the temperature of heat generation compared to the case where neither of them was added.

INDUSTRIAL APPLICABILITY

The exothermic agent of the present invention uses both calcium oxide and the 1:2 mixed aluminum powder in which two kinds of aluminum powder having different particle size distributions than the one described in Patent Document 1 are mixed in a ratio of 1:2; if necessary, it may further contain at least one component added as selected from the group consisting of calcium sulfate, ferrous sulfate, magnesium chloride, sodium sulfite, sodium phosphate, sodium carbonate, and mixtures thereof; having these compositions, the exothermic agent offers the industrial applicability exemplified below.

(1) Even if it weighs as little as 5 g, the exothermic agent of the present invention shows a maximum temperature of 90° C. or above and, what is more, it can maintain 80° C. or above on average for a period of 600 seconds after the start of heat generation; hence, it has such a good efficiency of heat generation compared to the exothermic agent described in Patent Document 1 that small-volume liquid foods such as canned coffee, Japanese sake and nursing bottles can be heated economically, which contributes to expanding new uses of the exothermic agent.

(2) On account of the large amount of heat that is generated per unit, the exothermic agent of the present invention can be reduced in mass and bulk. Hence, even if it is incorporated into ekiben (train lunch box), portable rations, outdoor products and the like, the overall mass and bulk can be made sufficiently small to reduce the burden on users. Therefore, various merchandise lines can be designed to fit the age, sex and sturdiness of individual users. For example, diverse commodities can be developed for specific users, depending upon whether they are healthy or ailing, or elementary school children, or male or female adults; this again contributes to expanding new uses of the exothermic agent.

The invention claimed is:

1. An exothermic agent comprising, per mass thereof,
   more than 30% but not more than 40% of a calcium oxide powder having an average particle size of 75 µm to 150 µm, and
   not less than 60% but less than 70% of a mixed aluminum powder in which
   (a) an aluminum powder having such a particle size distribution that a particle size of 45 µm pass is 70.0 to 80.0% and a particle size of 45 to 75 µm is 20.0 to 30.0% and
   (b) an aluminum powder having such a particle size distribution that a particle size of 45 µm pass is 60 to 70%, a particle size of 45 µm is 20 to 30%, a particle size of 63 µm is 7 to 10% and a particle size of 75 µm is 1.0 to 2.0% are mixed at a mass ratio of 1:2.

2. An exothermic agent comprising, per mass thereof,
   more than 30% but not more than 40% of a calcium oxide powder having an average particle size of 75 µm to 150 µm, and
   not less than 60% but less than 70% of a mixed aluminum powder in which
   (a) an aluminum powder having such a particle size distribution that a particle size of 45 µm pass is 70.0 to 80.0% and a particle size of 45 to 75 m is 20.0 to 30.0% and (b) an aluminum powder having such a particle size distribution that a particle size of 45 μm pass is 60 to 70%, a particle size of 45 μm is 20 to 30%, a particle size of 63 μm is 7 to 10% and a particle size of 75 μm is 1.0 to 2.0% are mixed at a mass ratio of 1:2, further containing at least one inorganic salt compound added to the exothermic agent comprising said calcium oxide powder and said mixed aluminum powder in an amount of 5 to 10% relative to the total mass of that exothermic agent, the inorganic salt compound being selected from the group consisting of calcium sulfate, ferrous sulfate, magnesium chloride, sodium sulfite, sodium phosphate, and sodium carbonate.

* * * * *